United States Patent
Doddi et al.

(10) Patent No.: US 12,499,077 B2
(45) Date of Patent: Dec. 16, 2025

(54) VARIABLE LINK WIDTH IN TWO DIRECTIONS FOR MAIN BAND CHIP MODULE CONNECTION

(71) Applicant: QUALCOMM Incorporated, San Diego, CA (US)

(72) Inventors: Ravindranath Doddi, Hyderabad (IN); Umamaheshwaran V, Salem (IN); Afreen Haider, Muzaffarpur (IN); Lekhya Pavani Godavarthi, Hyderabad (IN); Harinatha Reddy Ramireddy, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 353 days.

(21) Appl. No.: 18/306,034

(22) Filed: Apr. 24, 2023

(65) Prior Publication Data

US 2024/0354279 A1 Oct. 24, 2024

(51) Int. Cl.
*G06F 15/78* (2006.01)
*G06F 13/42* (2006.01)

(52) U.S. Cl.
CPC .......... *G06F 15/7825* (2013.01); *G06F 13/42* (2013.01)

(58) Field of Classification Search
CPC .... G06F 15/7825; G06F 13/42; G06F 1/3253; G06F 13/1678; G06F 13/4018; G06F 13/4063; G06F 13/4282; G06F 2212/7208; G06F 2213/0026; G06F 12/0246
See application file for complete search history.

(56) References Cited

U.S. PATENT DOCUMENTS

| | | | |
|---|---|---|---|
| 2016/0088637 A1 | 3/2016 | Suh et al. | |
| 2020/0226084 A1* | 7/2020 | Das Sharma | G06F 13/362 |
| 2022/0222198 A1 | 7/2022 | Lanka et al. | |
| 2022/0327276 A1* | 10/2022 | Seshan | G06F 13/382 |
| 2022/0334932 A1* | 10/2022 | Das Sharma | G06F 11/1004 |
| 2022/0334995 A1* | 10/2022 | Das Sharma | G06F 13/4221 |
| 2022/0342841 A1* | 10/2022 | Choudhary | G06F 13/4291 |

OTHER PUBLICATIONS

International Search Report and Written Opinion—PCT/US2024/018873—ISA/EPO—Jul. 12. 2024.
"Universal Chiplet Interconnect Express (UCIe)", Specification Revision 1.0, Feb. 24, 2022, 11 Pages, Sections (4.3.7, 4.4, 4.5, 4.5.1, 4.5.1.1-4.5.1.4, 4.5.2, 4.5.3, 4.5.3.1-4.5.3.3, 4.5.3.3.1 and 4.5.3.3.2).

* cited by examiner

*Primary Examiner* — Kevin T Bates
*Assistant Examiner* — Poonam Sharma
(74) *Attorney, Agent, or Firm* — Loza & Loza, LLP

(57) ABSTRACT

Aspects relate to variable link width in two directions for a main band chip module connection. In one aspect, a different set of data lines is active for transmit and receive data lines. In one example a method includes sending an enable request from a module of a first die to a module partner of a second die through a sideband to operate a main band of a die-to-die connection that connects the first die module to the second die module partner at a specified link width, the specified link width having a specified set of data lines of the main band. An enable response is received from the module partner through the sideband to operate the main band at the specified link width and data is communicated with the module partner through the main band using the specified link width in response to receiving the enable response.

20 Claims, 12 Drawing Sheets

VARIABLE LINK WIDTH IN TWO DIRECTIONS FOR MAIN BAND CHIP MODULE CONNECTION

TECHNICAL FIELD

Aspects of the present disclosure relate generally to data communication between integrated circuit chip modules and, in particular, to operation through a main band connection with a variable link width in two directions.

BACKGROUND

As integrated circuit (IC) chips grow smaller, it has become possible to package multiple chips into a single package. Each chip may be optimized for the cost, materials, fabrication process, and size that is best suited for a particular function. In such a package, a central processor may be fabricated separately from a graphics processor, a special purpose processor, a volatile memory, a non-volatile memory, an input/output controller, or other components. Different components may be packaged together to meet different needs without redesigning any of the individual components. By placing these disparate chips into a single package, the total system that includes the package may be made smaller. Similar principles apply to printed circuit board systems and subsystems. In addition, the connections between the disparate chips may be faster at less cost. In some cases, the smaller chips e.g., a memory, special purpose processor, or an interface are referred to as chiplets, however, any chip may be referred to as a chiplet.

The Universal Chiplet Interconnect express (UCIe) specification version 1.0 (UCIe 1.0) defines physical parameters and protocols for data transfer between a chip and a chiplet or between two chiplets. The connection may be direct or through a package. The interconnect may be within a single package or across a circuit board between two different packages. UCIe 1.0 is intended to support interoperability between chiplets of different manufacturers and designers. The UCIe 1.0 interconnect includes a MainBand which is the primary data transfer connection and a SideBand which is the primary initialization and control connection. A sequence of state transitions is defined to take the interconnect from SideBand Initialization to MainBand Initialization to Link Initialization to an Active state and back to standby and reset states.

A Standard Package version of UCIe 1.0 uses a MainBand with 16 data lanes and two clock lanes. The Standard Package version is directed to a larger bump pitch connector, e.g., 100-130 micrometers and longer distances, e.g., 10-25 mm that might be found connecting two packages on a circuit board. An Advanced Package version of UCIe 1.0 uses a MainBand with 64 data lanes, two clock lanes and an extra redundant clock lane. The Advanced Package version is directed to a smaller bump pitch connector, e.g., 25-55 micrometers and shorter distances, e.g., less than 2 mm that might be found within a package. New applications for each version and new versions may be developed over time.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example a method includes sending an enable request from a module of a first die to a module partner of a second die through a sideband to operate a main band of a die-to-die connection that connects the first die module to the second die module partner at a specified link width, the specified link width having a specified set of data lines of the main band. An enable response is received from the module partner through the sideband to operate the main band at the specified link width and data is communicated with the module partner through the main band using the specified link width in response to receiving the enable response.

In another example a non-transitory computer-readable medium has instructions stored therein for causing a processor of an interconnect link to perform the operations of the method above.

In another example an apparatus includes a sideband transmitter of a module of a first die configured to send an enable request to a module partner of a second die through a sideband of a die-to-die connection to operate a main band of the die-to-die connection at a specified link width, the specified link width having a specified set of data lines of the main band. A sideband receiver of the module is configured to receive an enable response from the module partner through the sideband to operate the main band at the specified link width, and a main band transmitter is configured to send data to the module partner through the main band using the specified link width in response to receiving the enable response.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A die-to-die connection herein can refer to a connection between any two dies, including a chip or a chiplet. A die may be considered to be any integrated circuit that is formed on and then cut, removed, or otherwise extracted from a wafer. The wafer may be silicon, glass, gallium nitride, or any other suitable material for forming integrated circuits. For the die-to-die connection, each die includes a module. As in UCIe 1.0, a module includes a die-to-die adapter processor, PHY (physical) logic, and the PHY interface. The interface includes the transmitters and receivers for each line. A die may have multiple modules that may be coupled to modules of different dies or to the same die. While examples are presented in the context of UCIe 1.0 this interface specification is not required. The die-to-die connections described herein may also be used to connect two packages across a printed circuit board A die-to-die connection can offer a bidirectional main band connection with a high data rate by using multiple data lanes. Each lane has a transmit data line and a receive data line. However, high data rates may consume power, and generate heat that is not necessary at all times. Instead of operating the main band connection intermittently, an approach is described to allow the main band connection to operate at a variable data rate, i.e., different numbers of data lanes may be active at different times to suit different circumstances. A main band interconnect between two chips can also be configured with differing numbers of data lines in each direction. A transmit set of lines and a receive set of lines may be set independently of each other through a sideband request and response. The number of lines may be set to meet different data rate requirements in each direction. A reduced number of lines reduces the power consumed by the main band. The number of lines may be set to avoid using a faulty line in only one direction or different faulty lines in each direction. The described approach may be applied to a UCIe MainBand interconnect or to other main band interconnects between IC chip modules that have multiple data lanes. In the present description, a main band connection is initialized using a sideband connection. In addition, parameters, configuration registers, signaling, and other features may be adapted to suit the variable link width operation.

Figure 1:
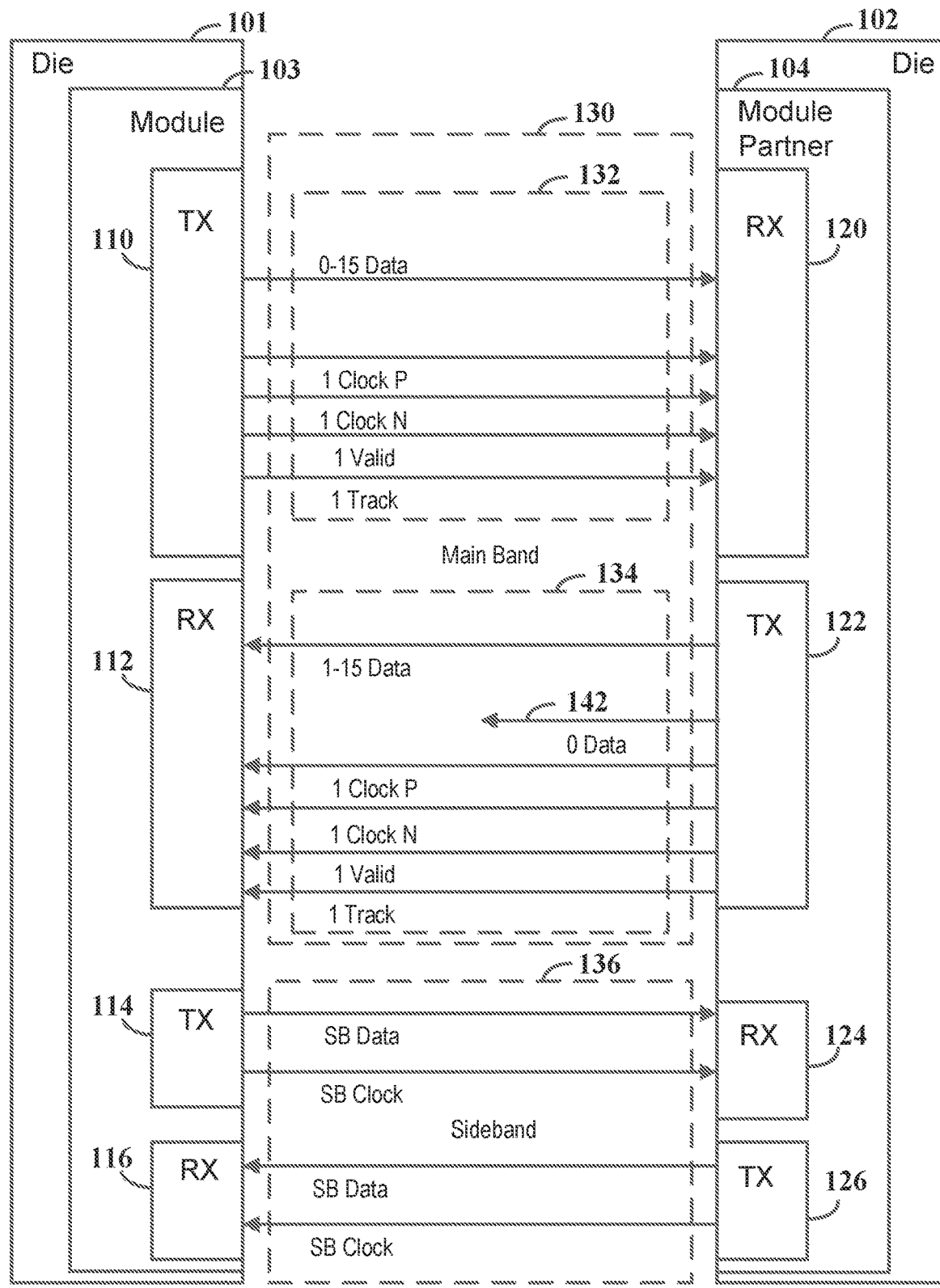
FIG. 1 is a block diagram of a module and a module partner coupled together with a die-to-die connection suitable for aspects of the present disclosure.

FIG. 1 is a block diagram of a first die 101 and a second die 102 coupled together with a 16 data lane die-to-die connection 100, e.g., a UCIe Standard package interconnect, according to some aspects. The die-to-die connection 100 has one faulty receive data line 142. Each die may have many other components (not shown) to generate, process, store, or communicate data or to supply or regulate power or perform operations, administration, or management functions, etc., depending on the nature of the die. The first die 101 has a module 103 and the second die 102 has a module partner 104. The module 103 and module partner 104 may have the same or a different structure and may include additional components (not shown) including interfaces, adapters, logic, buffers, etc. The connection 100 has a main band 130 and a sideband 136.

The connection has a main band 130 and a sideband 136. The main band has a transmit part 132 from the perspective of the module 103 and a receive part 134 from the perspective of the module 103. The sideband 136 also has a transmit part and a receive part each with a sideband data line and a sideband clock line. The connection is symmetrical in that the module 103 has a main band transmitter 110 and the module partner 104 has a main band transmitter 122. These two transmitters perform the same functions and operations in opposite directions using the same protocols. Similarly, the module 103 has a main band receiver 112 and the module partner 104 has a main band receiver 120. The present description is directed to the module and its construction and operation but the description applies equally to the module partner 104 in just the same way. Either side may initiate repair or training and either side may initiate parameter, and configuration changes, etc. The module 103 has a sideband transmitter 114 and a sideband receiver 116. The module partner 104 also has a sideband receiver 124 and transmitter 126.

UCIe 1.0 has a layered protocol with a physical layer and a die-to-die adapter. The physical layer can consist of all types of current packaging options from different fabricators and fabrication processes. Examples include 2D packaging, 2.5D packaging, 3D packaging and other approaches e.g., silicon-bridge, embedded multi-die interconnect bridge (EMIB), interposer-based chip-on-wafer-on-substrate (CoWoS), and fan-out chip on substrate (FOCoS) interposer packages, and any other connection between two dies on the same substrate or two packages on the same substrate. Optical or electrical connections may be made between packages to other components. UCIe may be expanded in future revisions to connect dies or packages across rack-based components.

UCIe 1.0 uses a protocol layer that runs on top of the physical layer, and that has many features in common with Peripheral Component Interconnect express (PCIe), Compute eXpress Link (CXL) and other pre-existing protocols. The PCIe protocol provides wide interoperability and flexibility. The CXL protocol provides low latency and high throughput connections. UCIe 1.0 may be expanded in future revisions to include other protocols and further modifications away from PCIe and CXL.

In UCIe 1.0, whenever a faulty lane is identified, link degrade may be chosen in order to repair the link by degrading the link to avoid the faulty lane. When link degrade is chosen during link training, it impacts both the transmit line and receive line of each affected lane. As a result, a faulty line in one direction will cause the functional corresponding line in the other direction to also be disabled. This reduces the data rate in both directions instead of only the direction that has the fault.

When there are many data lanes as in UCIe Advanced package with 64 bi-directional data lanes, the lanes require significant power to maintain even when the data lanes are not being used. UCIe 1.0 provides several low power or standby states but these states prevent all use of the data lanes. In some circumstances, the dies may have different data rate requirements for transmit than for receive. While one direction may benefit from all 64 lanes, the other direction may not be fully utilized. By allowing for a different link width in each direction, some of the data lines in one direction may be powered OFF or placed in standby even as the corresponding lines in the opposite direction are in full use. This helps to reduce power for the OFF or standby lines.

The structures and methods presented herein are described in the context of UCIe 1.0, but may be adapted to future versions of UCIe under any name and other connection configurations with multiple clock lanes. In FIG. 1, the main band 130 has two clock lanes that operate at the same frequency with different phase. There is one clock P line and one clock N line in the main band transmit part 132 and one clock P line and one clock N line in the main band receive part 134. In UCIe 1.0, this is the MainBand connection. The two transmit lines of the clock lane are sometimes referred to as TCLKP and TCLKN and the two receive lines of the clock lane are sometimes referred to as RCLKP and RCLKN. The 16 transmit data lanes each have a data line in the transmit part 132 and a data line in the receive part 134 for 16 lines in each direction. The main band connection also has a valid line and a track line in each direction.

In the transmit part 132 all 16 transmit data lines are functional. These lines are labeled 0-15. In the receive part 134, receive data line 0 is faulty but receive data lines 1-15 are functional. If both lines of a lane were required to be functional for the lane to function, then transmit data line 0 of the transmit part would be disabled to provide 15 bidirectional data lanes. By supporting a different number of transmit data lines from the number of receive data lines, all 16 transmit data lines may be used even when receive data line 0 of the receive part is faulty. Receive data line 0 is provided as an example. Any one or more of the data lines in either direction may fail and the main band may be reconfigured using the available functional data lines in each direction.

Figure 2:
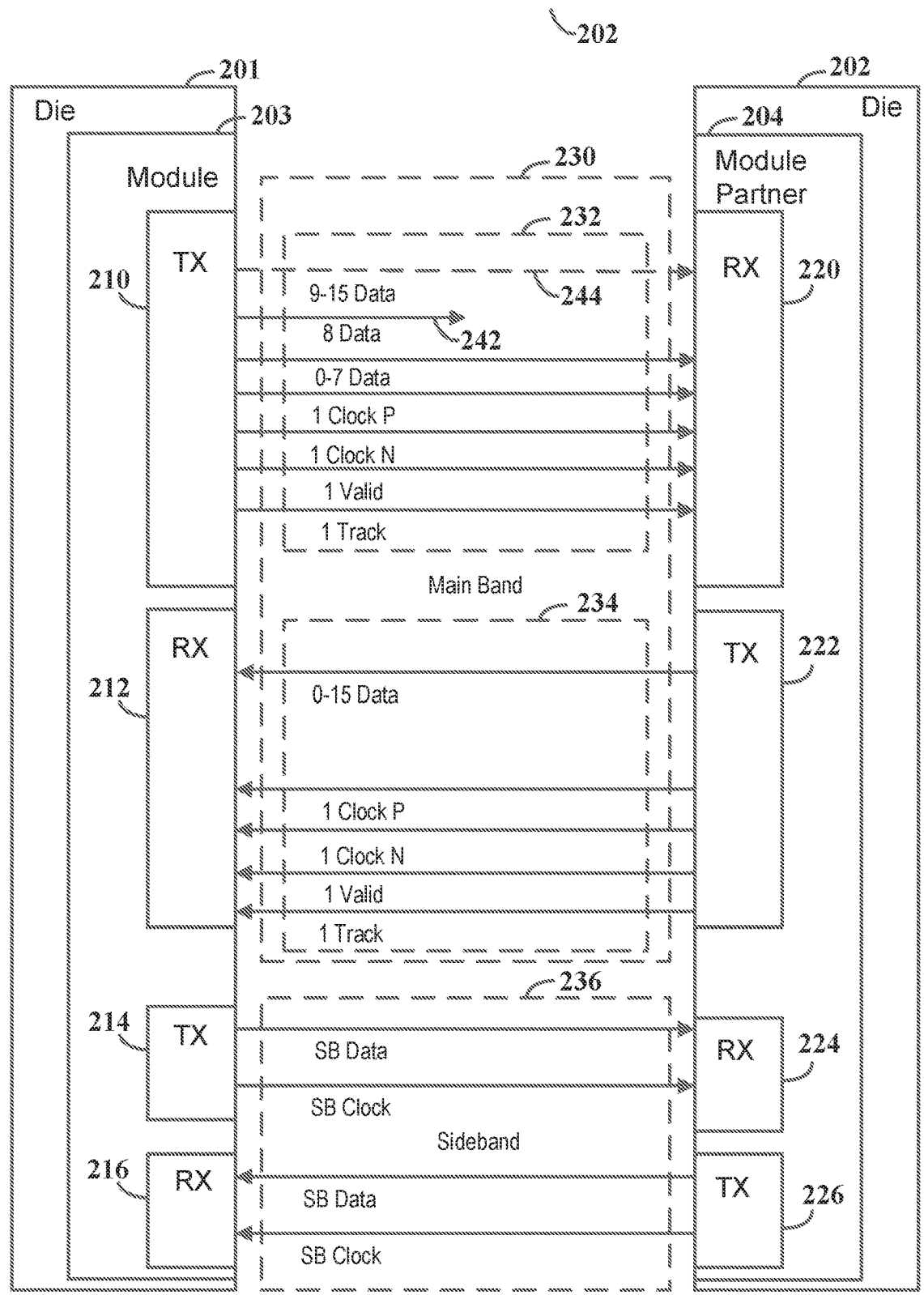
FIG. 2 is a block diagram of a module and a module partner coupled together with a 16 data lane die-to-die connection with one faulty transmit data line and nine disabled data lines suitable for aspects of the present disclosure.

FIG. 2 is a block diagram of a first die 201 and a second die 202 coupled together with a connection 200, such as a die-to-die connection 200, e.g., a UCIe 1.0 Standard package interconnect according to some aspects. In this example, the die-to-die connection 200 has one faulty transmit data line 242 and nine disabled data lines 244. A module 203 of the first die 201 has a transmitter 210 for the main band that is connected to a transmit part 232 of a main band 230. The transmit part 232 includes 16 transmit lines, a clock P line, a clock N line, a valid line, and a track line. The transmit part 232 is coupled to a module partner receiver 220 for the main band. The module partner receiver 220 is part of a module partner 204 of the second die 202. The module 203 has a main band receiver 212 that is connected to a receive part 234 of the main band 230. The receive part 234 includes 16 receive lines, a clock P line, a clock N line, a valid line, and a track line. The receive part 234 is coupled to a main band transmitter 222 of the module partner 204.

The module 203 also has a sideband transmitter 214 coupled through the sideband 236 of the die-to-die connection 200 to a sideband receiver 224 of the module partner 204. The module 203 has a sideband receiver 216 that is coupled through the sideband 236 of the die-to-die connection 200 to a sideband transmitter 226 of the module partner 204. The sideband has a sideband data line and a sideband clock line in each direction. In UCIe 1.0, the sideband has only one bidirectional clock lane.

As shown, transmit data line 8 242 within the transmit part 232 of the main band 230 is faulty. This is indicated by the truncated arrow that does not reach the receiver. This has caused functional transmit data lines 9-15 244 to be disabled in accordance with how lane repair is performed. The disabled lines are indicated by the dashed arrow that reaches from the module transmitter 210 to the module partner receiver 220. Transmit data lines 0-7 are functional and operating. This is indicated by the solid arrow that reaches from the transmitter to the receiver. The receive part 234 of the main band 230 is fully functional with all receive data lines 0-15 being functional and operating. This is permitted when the module 203 and module partner 204 are configured to allow for different transmit and receive link widths. The transmit data line 8 242 is provided as an example, any one or more transmit data lines and receive data lines may fail. The main band 230 may be reconfigured using the available functional lines differently in each direction to provide a higher data rate in one of the directions when allowed by the functional lines.

Considering the condition of the lines in the transmit part 232, the module transmitter 210 may disable the faulty line 242, line 8. In addition, lines 9-15 244 may also be disabled. At the module partner receiver 220, the unused lines, the faulty data line 242 and the disabled data lines 244 may be tri-stated. This reduces crosstalk on the data lines. In this configuration line 8 for the faulty line is tri-stated. Lines 0-7 are the specified set of data lines for the transmit part 232 of the main band 230. Lines 9-15 are the receive lines that are not of the specified set of data lines and are tri-stated.

Figure 3:
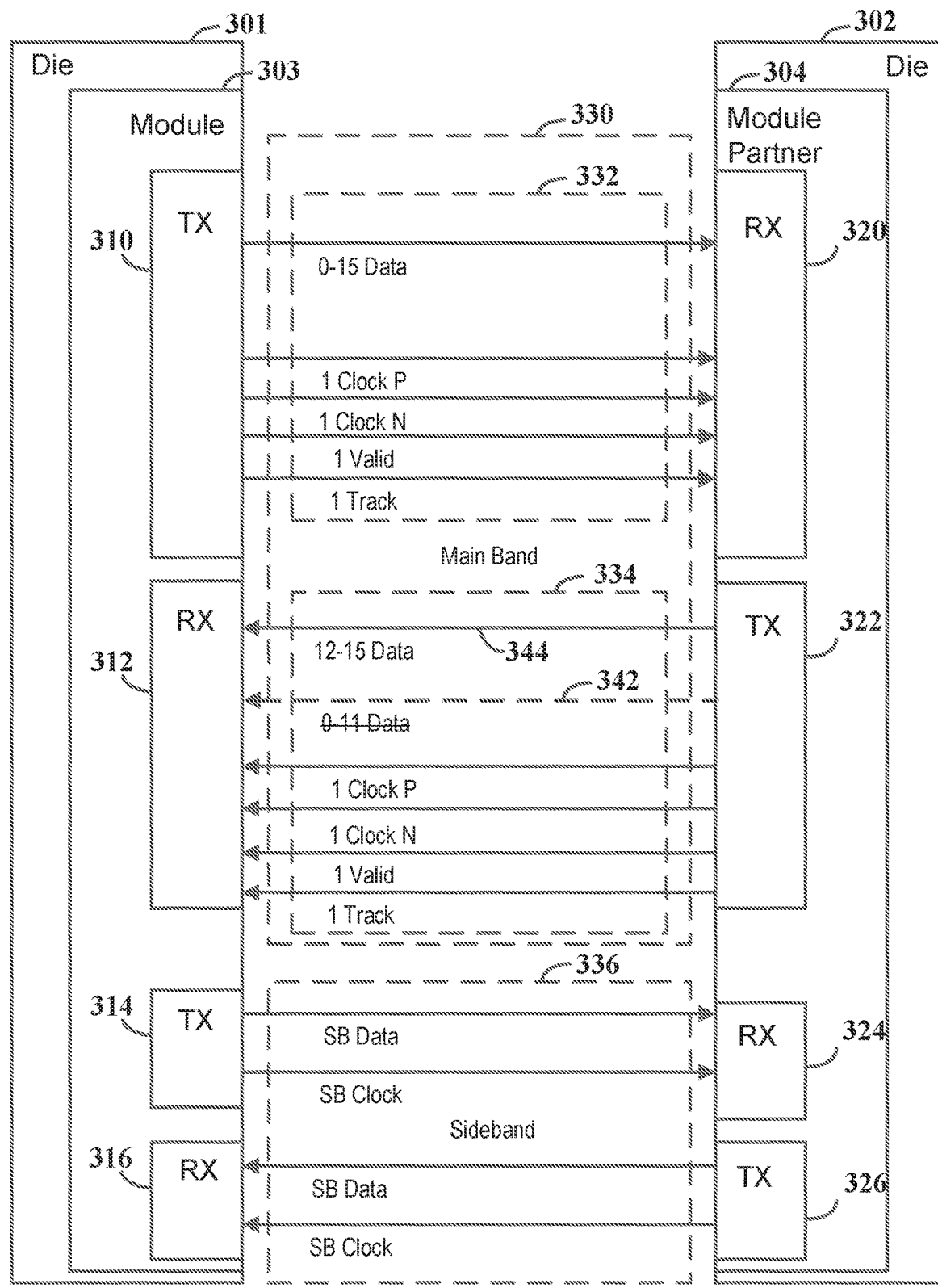
FIG. 3 is a block diagram of a module and a module partner coupled together with a 16 data lane die-to-die connection with 12 disabled receive data lines suitable for aspects of the present disclosure.

FIG. 3 is a block diagram of a first die 301 with a module 303 and second die 302 with a module partner 304 coupled together with a 16 data lane die-to-die connection 300, e.g., a UCIe 1.0 Standard package interconnect according to some aspects. In this example, the die-to-die connection 300 has 12 disabled receive data lines 342, 344. The module 303 has a main band transmitter 310 that is connected to a transmit part 332 of a main band 330. The transmit part 332 includes 16 transmit lines, a clock P line, a clock N line, a valid line, and a track line. The transmit part 332 is coupled to a main band receiver 320 of the module partner 304. The module 303 has a main band receiver 312 that is connected to a receive part 334 of the main band 330. The receive part 334 includes 16 transmit lines, a clock P line, a clock N line, a valid line, and a track line. The receive part 334 is coupled to a main band transmitter 322 of the module partner 304.

The module 303 also has a sideband transmitter 314 coupled through the sideband 336 of the die-to-die connection 300 to a sideband receiver 324 of the module partner 304. The module 303 has a sideband receiver 316 that is coupled through the sideband 336 of the die-to-die connection 300 to a sideband transmitter 326 of the module partner 304. The sideband has a sideband data line and a sideband clock line in each direction. In UCIe 1.0, the sideband has only one bidirectional clock lane.

As shown, the first 12 receive data lines 342, 0-11, within the receive part 334 of the main band 330 are disabled. These lanes may be functional lines that have been disabled because they are not needed. The last 4 receive data lines 344 of the 16 data line receive part 334 of the main band are operational. This has reduced the power consumption of the receive part 334 of the main band 330 by more than half. At the same time all 16 data lines, 0-15, of the transmit part 332 of the main band 330 are in operation. The module 303 or an upstream component may be configured to adjust the number of disabled lines in each direction to meet demands. The upstream component may be configured to send a command to the module to change the number of disabled lines in the transmit or receive direction. In some examples, the module 303 or the module partner 304 may be of a type that has different data rate requirements in a particular direction. For example, a sensor may have a higher transmit rate, than a receive rate. The main band 330 may be configured in light of the nature of the module 303 or the module partner 304.

Figure 4:
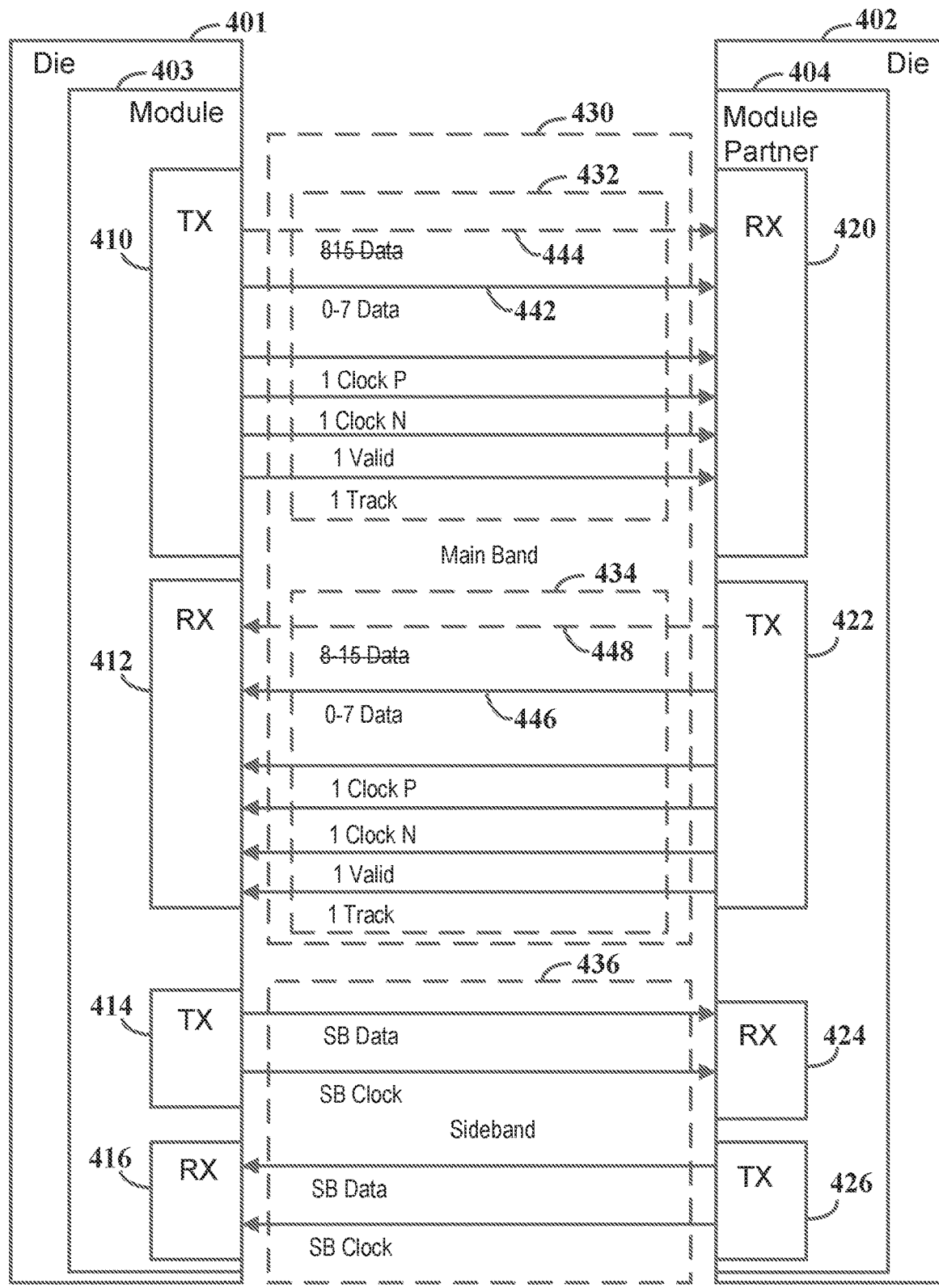
FIG. 4 is a block diagram of a module and a module partner coupled together with a 16 data lane die-to-die connection with half of the data lanes disabled suitable for aspects of the present disclosure.

FIG. 4 is a block diagram of a first die 401 with a module 403 and second die 402 with a module partner 404 coupled together with a 16 data lane die-to-die connection 400, e.g., a UCIe 1.0 Standard package interconnect according to some aspects. The die-to-die connection has 8 disabled data lanes. The module 403 has a main band transmitter 410 that is connected to a transmit part 432 of a main band 430. The transmit part 432 includes a data lane with 16 transmit lines, a clock P line, a clock N line, a valid line, and a track line. The transmit part 432 is coupled to a main band receiver 420 of the module partner 404. The module 403 has a main band receiver 412 that is connected to a receive part 434 of the main band 430. The receive part 434 includes a data lane with 16 transmit lines, a clock P line, a clock N line, a valid line, and a track line. The receive part 434 is coupled to a main band transmitter 422 of the module partner 404.

The module 403 also has a sideband transmitter 414 coupled through the sideband 436 of the die-to-die connection 400 to a sideband receiver 424 of the module partner 404. The module 403 has a sideband receiver 416 that is coupled through the sideband 436 of the die-to-die connection 400 to a sideband transmitter 426 of the module partner 404. The sideband has a sideband data line and a sideband clock line in each direction.

As shown, the last 8 transmit data lines 444, 8-15 within the transmit part 432 of the main band 430 are disabled. The last 8 receive data lines 448, 8-15, within the receive part 434 of the main band 430 are not used and may be tri-stated. At the module partner, the last 8 lines 444 to the main band receiver 420 are tri-stated and the last 8 lines 448 of the main band transmitter 422 are disabled. This disables the last 8 data lanes which is half of the 16 available data lanes. The first 8 transmit data lines 442, 0-7, and the first 8 receive lines 446, 0-7, are still active and operational. This has reduced the power consumption of the main band data lanes by almost half. The module 403, or an upstream component, may be configured to adjust the number of disabled lines in each direction to meet traffic demands. In this example, the data link width in the receive and transmit direction remain symmetrical for a matched data rate in each direction.

Figure 5:
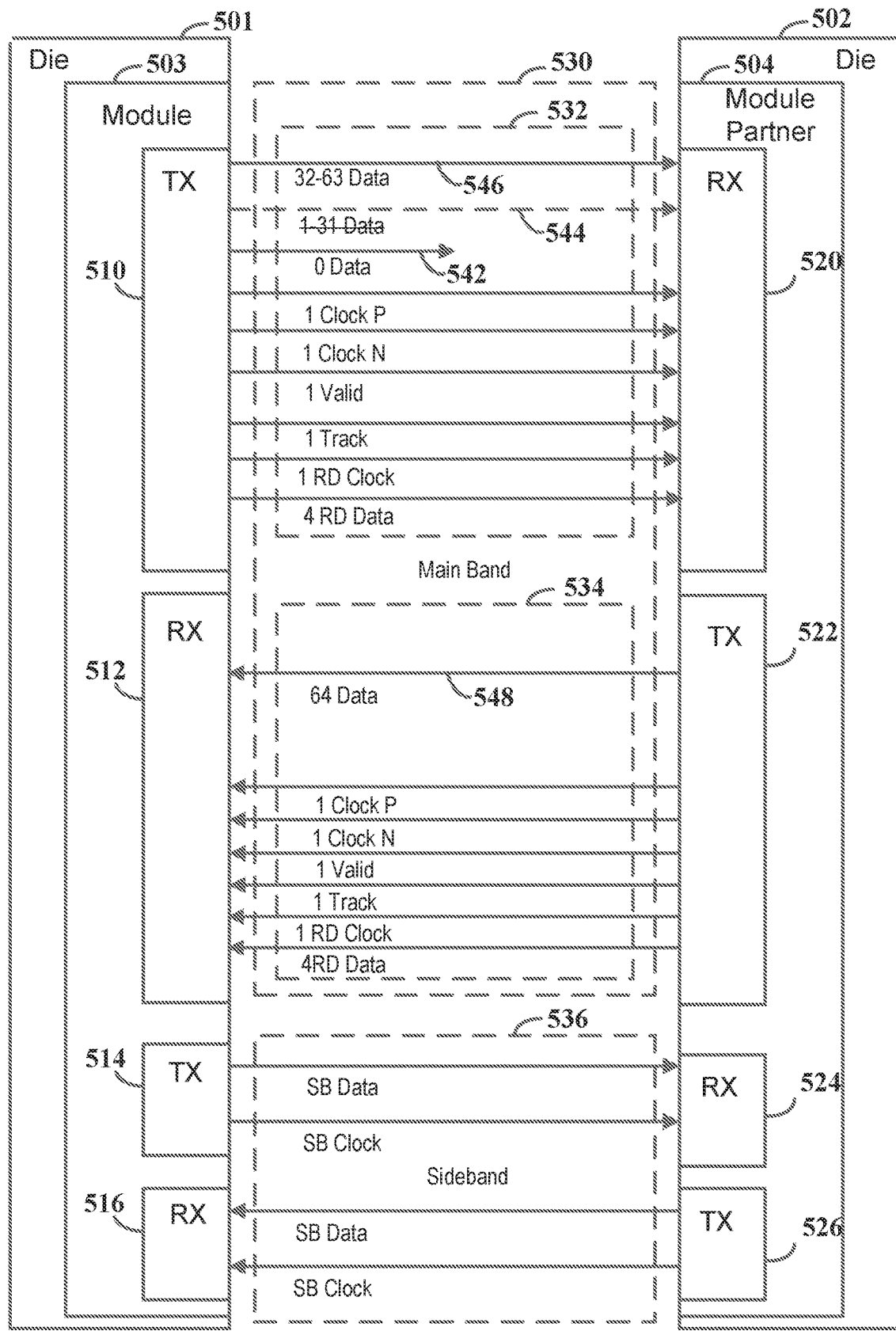
FIG. 5 is a block diagram of a module and a module partner coupled together with a 64 data lane die-to-die connection with one faulty transmit data line and 31 disabled transmit data lines suitable for aspects of the present disclosure.

FIG. 5 is a block diagram of a first die 501 with a module 503 and second die 502 with a module partner 504 coupled together with a 64-lane die-to-die connection 500, e.g., a UCIe Advanced package interconnect, according to some aspects. The die-to-die connection 500 has one faulty transmit data line and 31 disabled transmit data lines. The module 503 has a main band transmitter 510 that is connected to a transmit part 532 of a main band 530. The transmit part 532 includes 64 transmit data lines, a clock P line, a clock N line, a valid line, and a track line. The Advanced package main band transmit part 532 also includes a redundant clock line (RD Clock) and 4 redundant data lines (RD Data). The redundant lines are configured for use when one or more of the primary data or clock lines fail. The transmit part 532 is coupled to a main band receiver 520 of the module partner 504. The module 503 has a main band receiver 512 that is connected to a receive part 534 of the main band 530. The receive part 534 includes 64 receive data lines, a clock P line, a clock N line, a valid line, a track line, a redundant clock line, and 4 redundant data lines. The receive part 534 is coupled to a main band transmitter 522 of the module partner 504.

There is one bidirectional redundant clock lane provided as a repair mechanism in case of a fault on one of the clock lanes. A fault on either one of the clock lanes, P, N, will lead to configuring the redundant clock lane to replace the faulty clock lane. The module also has a sideband transmitter 514 coupled through the sideband 536 of the die-to-die connection 500 to a sideband receiver 524 of the module partner 504. The sideband 536 may be the same or similar to the sideband examples of FIGS. 1-4. The module 503 has a sideband receiver 516 that is coupled through the sideband 536 of the die-to-die connection 500 to a sideband transmitter 526 of the module partner 504. The sideband has a bidirectional data lane and a bidirectional clock lane.

In this example, transmit data line 0 is faulty. In addition, transmit data lines 1-31 have been disabled to reduce the data link width to 32 active transmit data lines instead of the original 64. The receive data lines are not changed. This example is provided to show a variation in which functional lines may be disabled even when there also is a faulty line. The faulty and disabled lines may also or instead be in the receive part 534 of the main band 530. The particular lines are provided as examples and different lines may be affected. In addition, this example use may be applied to the 16 data lane die-to-die connection and any of the examples of FIGS. 1-4 may be applied to this 64 data lane die-to-die connection.

Figure 6:
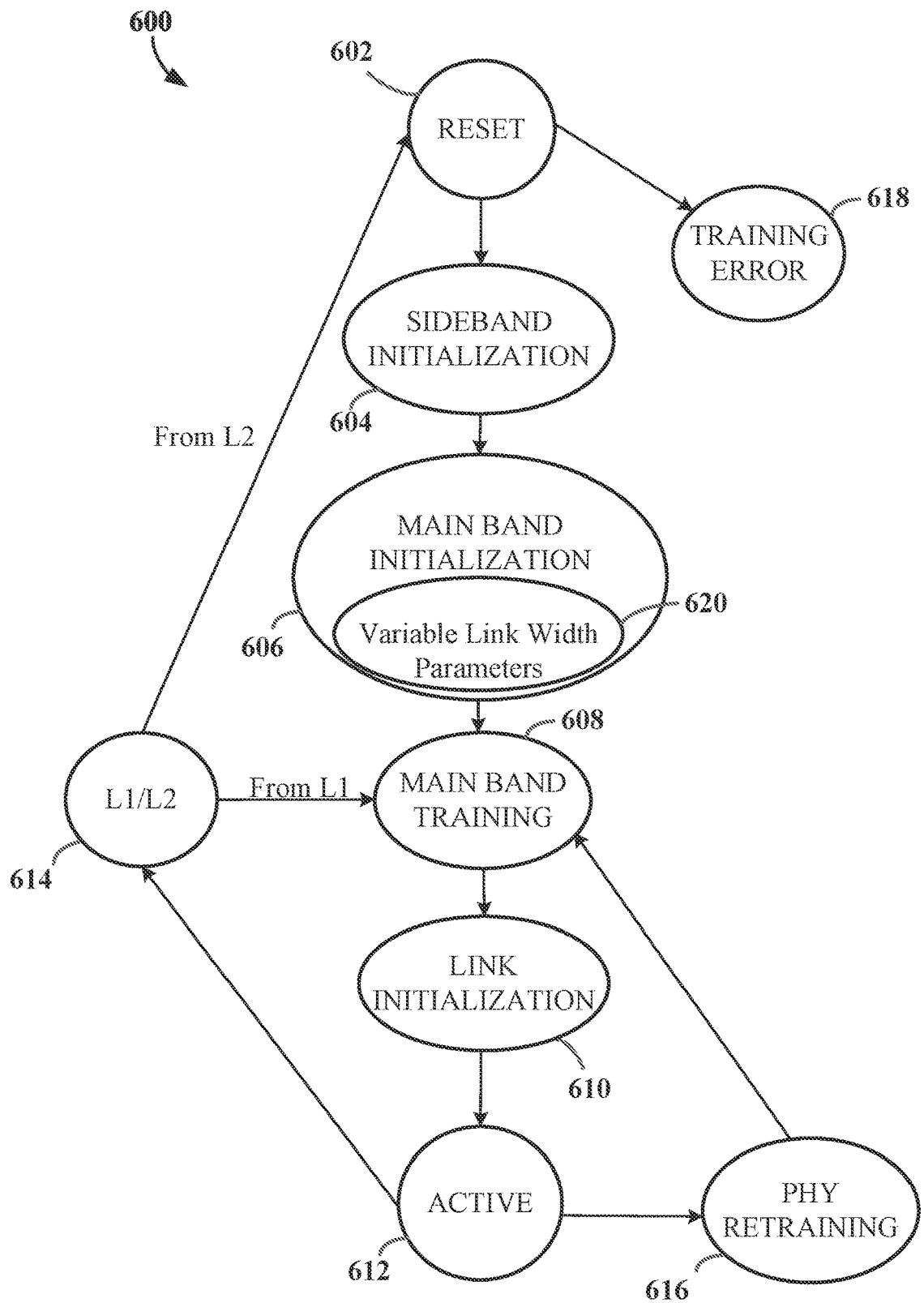
FIG. 6 is a diagram of a connection operation state machine according to aspects of the present disclosure.

FIG. 6 is a state machine diagram of a connection operation state machine 600, according to some aspects. The state machine is related to a link layer form of the physical layer connection, e.g., 100, 500 described above. The same state machine may be used for UCIe Advanced mode or Standard mode or other configurations with adaptations to accommodate the differences in the lanes, as described above. The state machine 600 begins with a reset state 602 which may be obtained upon startup or upon recovery from a deep sleep or low power state, e.g., L2 state 614, or to recover from a failure. The reset state 602 may also be entered by command from higher level layers of the die, e.g., a command to switch to different main band link width.

From the reset state 602, the state machine enters a sideband initialization state 604. The sideband is a low speed, high reliability part of the die-to-die connection. It is configured to be easily initialized even when there are other failures or difficult environmental conditions. After the sideband initialization state 604, the state machine may advance to a main band initialization state 606. The main band initialization state includes a variable link width parameters sub-state 620. In some aspects, different link widths may be specified for the transmit and receive lines of the main band. In some aspects different link widths may be specified that apply to both transmit and receive lines of the main band. These may be initialized in the main band initialization state using a main band initialization (MBINIT). The specified link widths may be exchanged as parameters in sideband messages and the parameters may be stored in a link configuration register.

After the main band initialization state 606 is completed, including the variable link width parameters sub-state 620, the state machine 600 advances to a link initialization state 610. The link initialization state 610 refers to the connections between the module and the module partner. In some examples, only the connections that are in the specified link width are trained in a main band training state 608 and initialized in the link initialization state 610. If a link with 64 data lanes has a specified link width of 16 data lanes as in FIG. 5, then the main band training state 608 and the link initialization state 610 will be completed much quicker. After the link initialization state 610, the state machine moves to an active state 612 for data communication between the module and the module partner. The state machine continues in the active state 612 until some event requires a transition.

One type of transition is to a PHY retraining state 616. The PHY retraining state 616 allows for the PHY layer of the connection to be retrained in the event of errors, or changes in circumstances or conditions on the connection. As an example, a mechanism to reconfigure the number or selection of active data lines in either the transmit or receive directions is to transition to the PHY retraining state 616 during the active state 612. A new configuration of active data lines may be trained in the PHY retraining state 616. After the PHY retraining state 616, the state machine returns to the main band training state 608 to train the new configuration of the main band and then to the link initialization state 610 and back to the active state 612 which has been recovered from the PHY retraining state 616.

Another type of transition is to an L1/L2 state 614. The L1/L2 state 614 includes two different low power or standby conditions to accommodate inactivity on the die-to-die connection. In order to reduce power consumption, heat generation, and/or wear on the dies or the connection components, the state machine 600 can transition to an L1 standby which disables many of the components of the connection especially across the main band part. From the L1 standby of the L1/L2 state 614, the state machine 600 transitions to the main band training state 608. From the main band training state 608, the state machine transitions to the link initialization state 610 and back to the active state 612. The L2 standby is a deeper standby with more components, including clock shut down to save more power. From L2 standby, the state machine 600 transitions from the L1/L2 state 614 back to the reset state 602. From the reset state 602, the full process of state machine transitions is performed to reach the active state 612. There may be more or fewer standby or low power states than L1 standby and L2 standby to suit different implementations.

One further state is a training error state 618 reached as a transition from the reset state 602. This state is a dead end and results in an inoperable connection. If the module is restarted, then the module re-enters the reset state 602 and may be able to initialize or may return to the training error state 618.

Using the state machine 600, different link widths are entered or exited using the variable link width parameters sub-state 620. The variable link width parameters sub-state 620 may be entered as a part of the main band initialization state 606. When the link width of the main band part of the connection is changed, the main band connection is initialized for the new link width in the main band initialization state 606, then the main band connection is trained for the new link width in the main band training state 608, then the state machine 600 transitions to the link initialization state 610 and the active state 612.

The variable link width parameters sub-state 620 is entered from the reset state 602. In some circumstances, the die-to-die connection is starting up and the connection may be initialized through all of the states using a default link width or a specified link width that is different from the default link width as the state machine progresses through the main band initialization state. In some circumstances, one or more data lines may fail, in which case, the state machine returns to the reset state 602 to determine the fault and to initialize the main band connection using one or more functional data lines. In some circumstances, a higher layer of the module commands a transition to a different link width in the receive data lines, the transmit data lines or both due to traffic, performance, thermal, or other conditions. The state machine 600 may transition through L2 standby at the L1/L2 state 614 back to the reset state 602.

Figure 7:
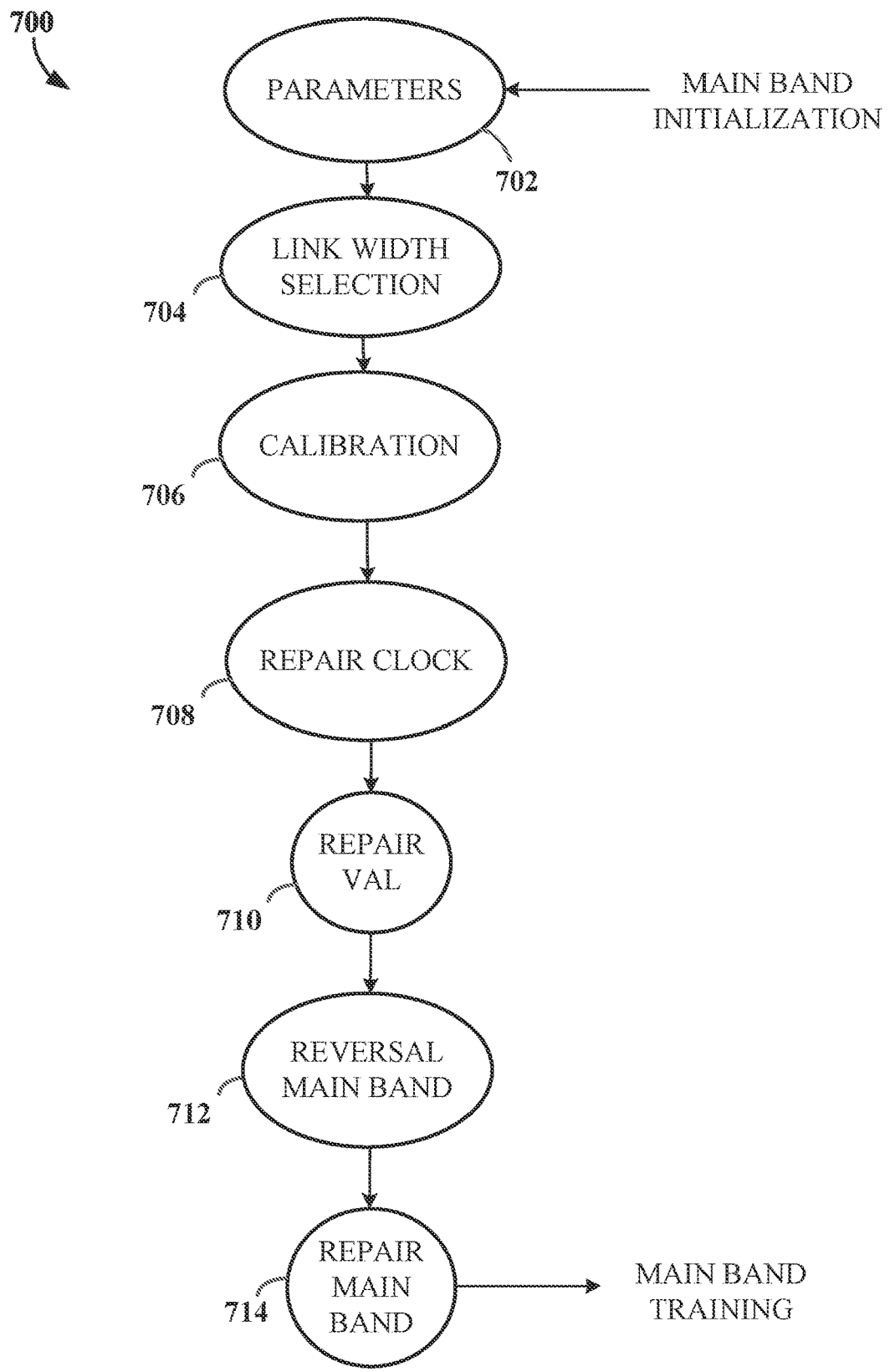
FIG. 7 is a diagram of main band initialization state machine according to aspects of the present disclosure.

FIG. 7 is a main band initialization state machine 700 which provides additional detail about the main band initialization state 606, according to some aspects. The main band initialization state machine 700 is entered by the main band initialization state to a parameters state 702 during which parameters for operation of the die-to-die connection are shared between the module and the module partner. Next, the link width selection state 704 includes selecting link widths for transmit and receive data lines for the active state. The link width selection state 704 also includes setting parameters in link configuration registers to support the selected modes.

In the link width selection state, any of the data line configurations of FIGS. 1-5 or other configurations may be selected. The illustrated configurations are provided as examples and may other configurations may be made. Following the link width selection state 704, a calibration state 706 is entered to calibrate the links to use the selected clock and data lanes.

The repair clock state 708 follows the calibration state 706 and allows for training patterns to be sent and received between the module and the module partner to test the clock connections between the module and the module partner through the connection.

The repair valid state 710 is used to train the valid lane which is used to frame the data on the data lines. The Valid signal is a type of clock signal. In UCIe 1.0, the Valid signal marks the start, and middle of a data packet on the data lines. For each 8-bit data packet with 8-unit intervals (UIs), the Valid signal is asserted for the first 4 UI and de-asserted for the second 4 UI. It is asserted again at the start of the next 8-bit packet.

The reversal main band state 712 allows for a test of the main band to determine if reversal should be applied to the data lanes of the main band connection. With reversal, lane 15 or lane 63 becomes lane 0 and the designation of the lanes counts through to lane 0 which becomes lane 15 or lane 63.

The repair main band state 714 is a training state of the main band data communication in which known patterns are transmitted on the data lanes to test each data lane for proper operation. Each data lane is tested in both the transmit data line and the receive data line. When a faulty data line is found in either direction through the repair main band state 714, then the link width may be modified to exclude the faulty data line.

In UCIe 1.0, the data lanes are tested in the repair main band state when the UCIe Module sends 128 iterations of a Per Lane ID pattern (LSB first) on all N MainBand data Lanes with correct, valid framing on the Valid Lane along with the forwarded clock. N is 68 (64 Data+4 RD) for the Advanced package interface and 16 for Standard Package interface. The UCIe Module Partner performs a per lane compare on its receivers on all N Lanes. Detection on a lane is considered successful if at least 16 consecutive iterations of the Per Lane ID pattern are detected. The UCIe Module Partner logs the detection result for its receive lines to be used for lane fault detection. After sending 128 iterations of the Per Lane ID pattern, the UCIe Module stops sending the pattern and sends a MBINIT.REVERSALMB result req sideband message to get the logged result. The UCIe Module Partner stops the comparison and responds with a MBINIT-.REVERSALMB result resp sideband message with N-bit (68 for Advanced and 16 for Standard Package interface) per lane result.

After completing the operations of the main band initialization state machine 700, the link training state machine then transitions out of the main band initialization state 606 to the main band training state 608 as shown in FIG. 6.

Figure 8:
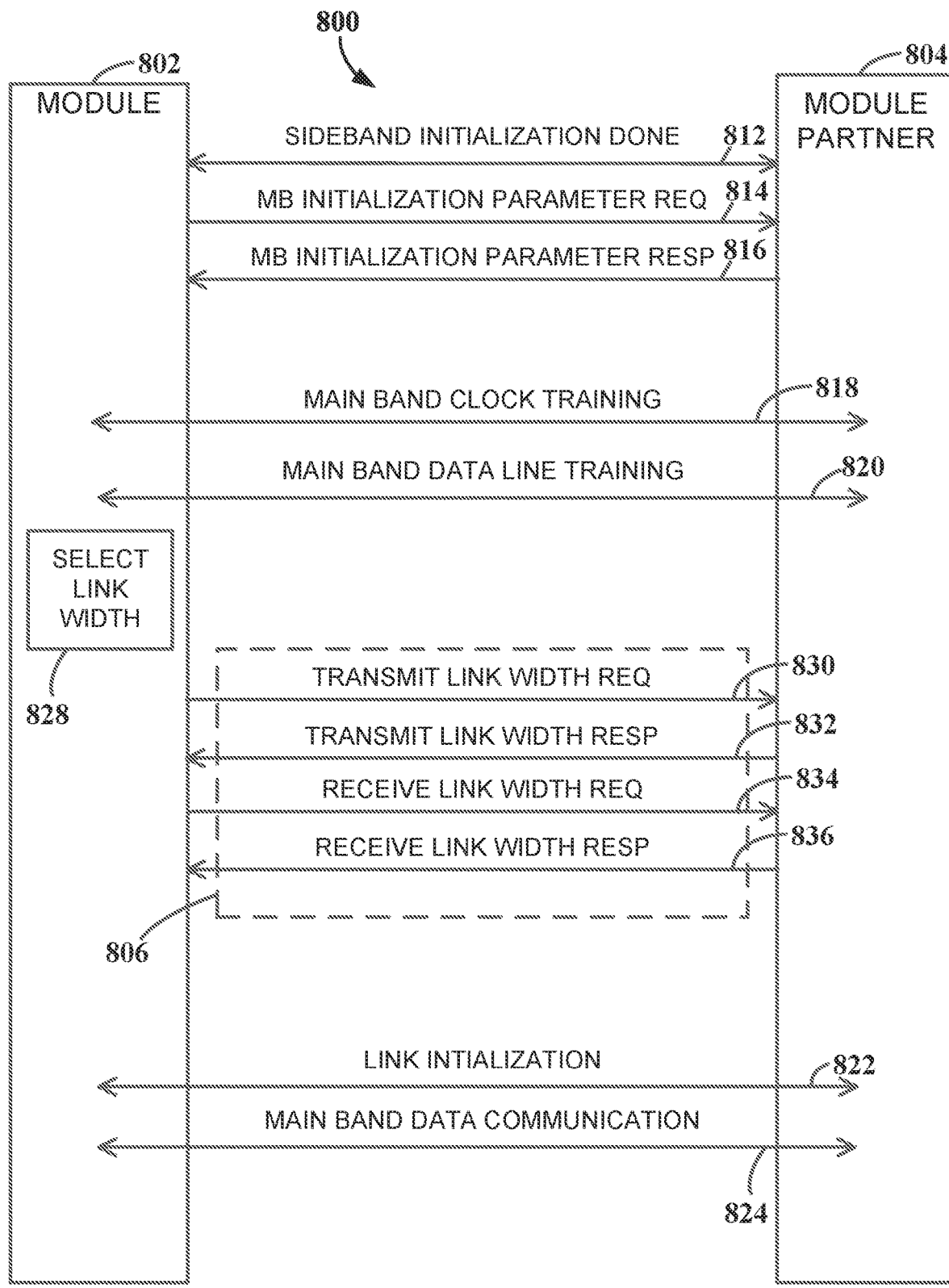
FIG. 8 is a signaling diagram of messages between a module and a module partner to initialize a main band at a selected link width according to aspects of the present disclosure.

FIG. 8 is a signaling diagram of messages between a module 802 of a first die and a module partner 804 of a second die to initialize a main band at a selected link width, according to some aspects. The signaling 800 may be used when a die-to-die adapter processor moves from the reset state 602 of FIG. 6. This may occur, for example, on startup or in a transition from an L2 state 614. The signaling begins after sideband initialization has been performed. The module and the module partner send messages of sideband initialization done 812. This corresponds to the end of the sideband initialization state 604 of FIG. 6. The module 802 then sends a main band initialization parameter request 814 to the module partner 804. The module partner 804 replies with a main band initialization parameter response 816. These are also exchanged through the initialized sideband. The module 802 and module partner 804 perform this handshake to determine whether variable link widths are supported. The parameters may include a variable link width support parameter. The parameters may then be stored in a link configuration register.

After the parameter exchange, main band clock training 198 is performed across the main band and main band data line training 820 is performed across the main band.

UCIe 1.0 provides a more specific example for a parameter exchange. There is an exchange referred to as MBINIT-.PARAM. Parameters for enabling variable link widths may be exchanged during this exchange or during a different operation. In UCIe 1.0 for both Standard package and Advanced package the MainBand initialization request message is referred to as MBINIT.PARAM configuration req. This is a sideband request to exchange parameters with the UCIe Module Partner. The request includes the parameters. The response from the module partner is referred to as MBINIT.PARAM configuration resp and is also a sideband message. When variable link widths are supported, another parameter may be added to the same sideband messages. This parameter is referred to as VB_sup herein, the support parameter, wherein a value of "0" or low indicates that the variable link width is not supported and a value of "1" or high indicates that the variable link width is supported.

The sender of the additional support parameter in a sideband support request requests that the module partner also support variable link width. The module partner responds with a support parameter, VB_sup, that is set to high or low to indicate whether the module partner supports variable link width. If the request and the response both contain the parameter set to high, the variable link width is supported and the parameter is stored to the link configuration register. The support parameter, VB_sup, may be referred to by any other name. In some examples, the module and module partner are configured to support variable link width without the handshake to send and receive the parameter through sideband request and response as shown.

An administrator, implementer, manufacturer, vendor, local or remote controller or another entity may select that the die-to-die connection is permitted to operate with a variable link width. In some aspects, this is accomplished by setting a parameter in a main band configuration register, e.g., a link configuration register, to allow variable link width operation. The parameter may be added to a UCIe 1.0 register referred to as, MainBand config_reg. Alternatively, a different configuration register may be used. During the main band parameter initialization phase, which includes the main band initialization parameter request 812 and the main band initialization parameter response 816, the module 802 and the module partner 804 will handshake through the sideband to determine whether variable link width is supported on both the module and the module partner. This may be done based on the support parameter.

After the link width initialization process, A main band clock training 818 may be started. This process may include an initialization request and response followed by a clock repair training pattern that is bi-directional through the main band connection and follows a known pattern so that the transmitter and receiver at each end are able to detect and train to the clock signal. Any other suitable clock training process may be used. The main band clock training 818 may be followed by main band data line training 820. The main band data line training may also be bi-directional through all the enabled data lines of the main band.

At 828, the module selects a link width or receives a selection of a link width from a higher layer component. This may occur in response to a detected data lane fault, in response to a command from a higher level, in response to expected data traffic requirements, or for any other reason. The module then starts a link width configuration process 806. The module 802 sends a transmit link width request 830 to the module partner 804. The transmit link width request is an enable request to the module partner to operate the main band at a specified transmit link width. The specified transmit link width has a specified set of transmit data lines of the main band. The request may include a transmit enable parameter and transmit link width parameters. This is sent through the sideband. The request for a transmit link width is then answered with a transmit link width response 832 that may also include a transmit enable parameter and link width parameters. The module then sends a receive link width request 834. The receive link width request is an enable request to the module partner to operate the main band at a specified receive link width. The specified receive link width has a specified set of receive data lines of the main band. The request may include a receive enable parameter and receive link width parameters. This request is answered by a receive link width response 836 that may also include a receive enable parameter and receive link width parameters.

In this example, the transmit link width request 830 and the receive link width request 834 are indicated as being different requests. However, this may be combined into a single link width request for transmit data lines and also for receive data lines. The single link width request may indicate different link widths for transmit and receive or a single link width for both transmit and for receive.

Upon completion of the transmit link width request 830 and the receive link width request 834, the main band has been configured for the new transmit link width and the receive link width at both the module 802 and the module partner 804. The signaling then proceeds to link initialization 822. This corresponds to the link initialization state 610 of FIG. 6. The signaling then proceeds to main band communication 824. This corresponds to the active state 612 in FIG. 6. In an example, the main band clock training 818 and the main band data line training 820 are instead performed after the link width configuration process. This allows the training to be performed only on the specified sets of data lines in the specified link width.

Table 1 is an example of a portion of a link configuration register, referred to herein as config_reg, that may be configured to support a variable link width for a main band, e.g., a MainBand for the Advanced package or a MainBand for the Standard package. More registers may be added to accommodate more link variations and for other connection configurations. In some aspects, the value in each position is set to zero by default and upon initiation. During the main band initialization state 606 and, in particular the variable link width parameters sub-state 620, described above, a sideband support request is sent to the module partner to support a variable link width for the main band. This is a part of the main band initialization parameter request 814 and may include a support parameter. Upon receiving a sideband support response from the module partner, shown as the main band initialization parameter response 816, which may include a support parameter, a support bit may be added to the configuration register.

In Table 1, there is a support bit for the transmit side, TxD_sup, and a support bit for the receive side, RxD_sup. In an example, when these are both "1" or high, the two dies support a specified link width for the transmit data lines and a separate specified link width for the receive data lines of the main band. In an example, when these are both "0" or low, then the two dies do not support a specified link width for the transmit data lines nor for the receive data lines. In an example, when TxD_sup is high and RxD_sup is low, then the two dies support variable link widths except that the specified set of transmit data lines must be equal to the specified set of receive data lines. In other words, the data lane width may be varied but not the lines in each direction.

Upon receiving a sideband enable response from the module partner, shown as the transmit link width response 832 and the receive link width response 836, the remaining link configuration parameters of Table 1 may be set for the transmit lines and the receive lines respectively. In particular Tx_VB1, and Tx_VB0 are the transmit link width parameters, and TxD_en is the transmit enable parameter. These may be set based on the transmit link width response 836. Rx_VB1 and Rx_VB0 are the receive link width parameters and RxD_en is the receive enable parameter and may be set based on the receive link width response 836.

TABLE 1

| Tx_config_reg | Tx_VB1 | Tx_VB0 | TxD_en | TxD_sup |
|---|---|---|---|---|
| Rx_config_reg | Rx_VB1 | Rx_VB0 | RxD_en | RxD_sup |

When the TxD_en bit, the transmit enable parameter, is set to "1" or high then the main band connection is operated with a variable transmit data link width. The link width is specified by the other two parameters as shown in Table 2. Similarly, when the RxD_en bit, the receive enable parameter, is set to "1" or high then the main band connection is operated with a variable receive data link width.

Table 2 is an example of a link width selection table configured to provide the specified data link width in the transmit data lines using Tx_VB1 and Tx_VB0. Similarly, the specified data link width in the receive direction is provided by the combination of Rx_VB1 and Rx_VB0. In this example, 2 bits provide 4 possible choices, 64, 32, 16, and 8 active lines. These are only suitable for a 64-lane main band, e.g., a UCIe Advanced package. For a 16-lane main band, different choices may be used, e.g., 16, 8, 4, and 2 lines. More or fewer bits may be used to represent more or fewer data line selections for the sets of data lines in Table 2. In an example a Tx_VB2 bit is also used to allow for 8 possible data line selections instead of the 4 possible selections, as shown.

TABLE 2

| Tx_VB1 | Tx_VB0 | Data Bandwidth | Rx_VB1 | Rx_VB0 |
|---|---|---|---|---|
| 0 | 0 | 64 Active lines | 0 | 0 |
| 0 | 1 | 8 Active lines | 0 | 1 |
| 1 | 0 | 16 Active lines | 1 | 0 |
| 1 | 1 | 32 Active lines | 1 | 1 |

Figure 9:
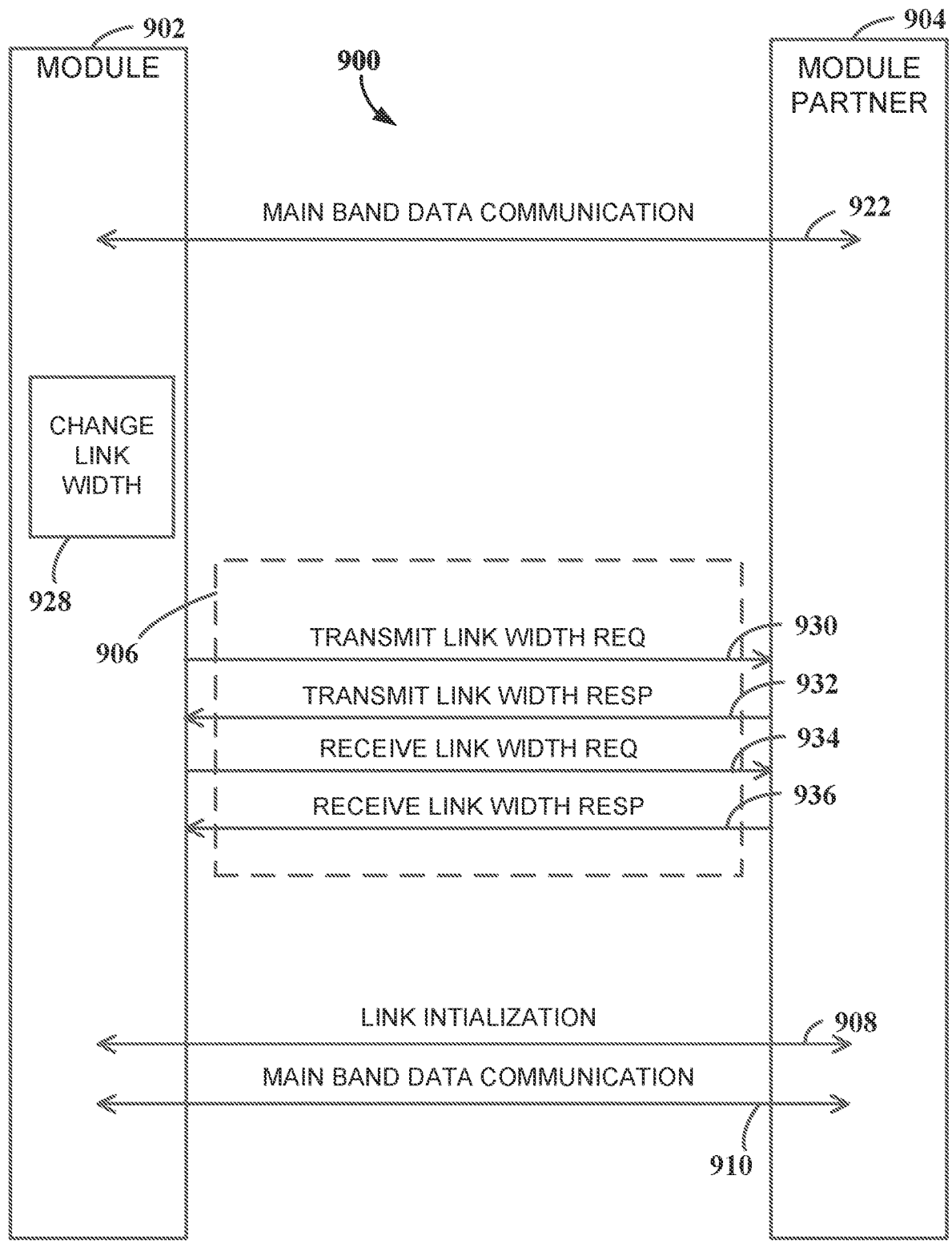
FIG. 9 is a signaling diagram of messages between a module and a module partner to change a main band data link width according to aspects of the present disclosure.

FIG. 9 is a signaling diagram of messages between a module 902 and a module partner 904 to change a main band data link width. This may be done to reduce power, reduce the data rate, or for other benefits. The signaling 900 may be used when a die-to-die adapter processor moves from the active state 612 through a PHY retraining state 616 to the main band training state 608 of FIG. 6. The signaling may also be used for a transition from the active state 614 through the L1 state 614 to the main band training state 608. The signaling begins after sideband initialization has been performed. The module and the module partner have already initialized main band data communication 922. In this example, the module 902 and module partner 904 have already performed a parameter handshake to determine whether a variable link width is supported.

A local or remote controller or another entity determines that the die-to-die connection should change to a different link width. In response to this determination or command, the module 902 determines to change the link width 928. The module then starts a link width configuration process 906. The module 902 sends a transmit link width request 930 to the module partner 904. The transmit link width request is an enable request to the module partner to operate the main band at a specified transmit link width. The request for a transmit link width is then answered with a transmit link width response 932. The module then sends a receive link width request 934. The receive link width request 934 is an enable request to the module partner to operate the main band at a specified receive link width. This request is answered by a receive link width response 936. If there is no such response, then the main band data communication 922 may continue.

In some examples only the transmit link width is changed in which case there is no need to send the receive link width request 934 and no receive link width response 936 is received. In some examples, only the receive link width is changed in which case there is no need to send a transmit link width request 930 and no transmit link width response 932 is received. In some examples, both the transmit link width and the receive link width are to be changed to the same link width, in which case, only one link width request may be required. A sideband enable request to operate the main band at a specified link width may be used for any of these examples and to change both directions of the link width independently.

The specified set of transmit data lines and the specified set of receive data lines may be included in the request and response using e.g., the Tx_VB, Tx_VB0, Rx_VB1 and Rx_VB0 parameters or any other suitable information parameter. The process continues with optional main band training of the specified sets of data lines, then link initialization at 908 and main band data communication 910 using the newly specified transmit link width and the specified receive link width. In some examples, the main band training has been performed for the original main band data communication 922 and there is no need to repeat the main band training so this operation is not performed.

Figure 10:
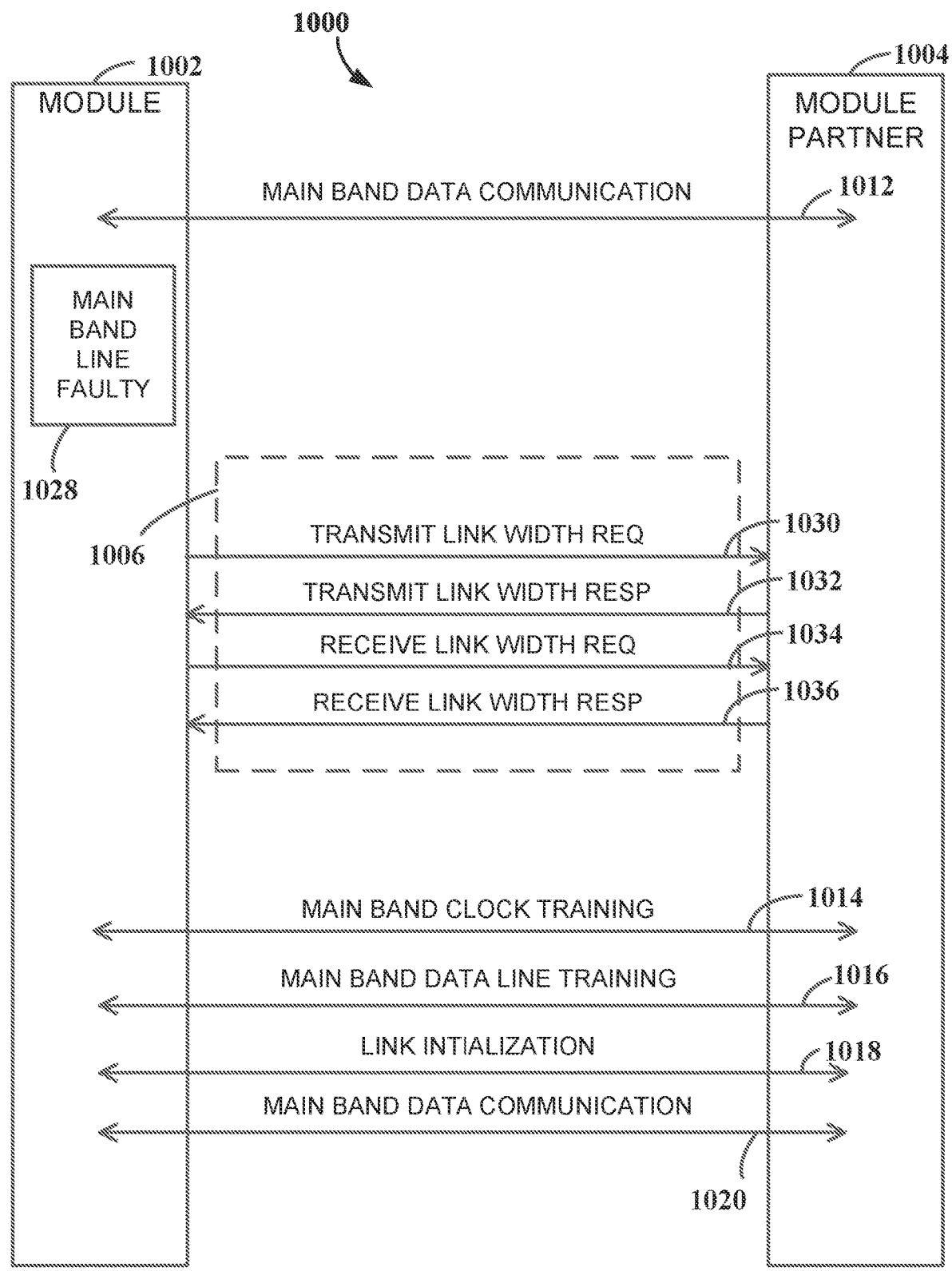
FIG. 10 is a signaling diagram of messages between a module and a module partner to repair a main band after a data line failure according to aspects of the present disclosure.

FIG. 10 is a signaling diagram of messages between a module 1002 and a module partner 1004 to repair a main band after a data line failure. The signaling 1000 may be used when a die-to-die adapter processor moves from the active state 612 to the PHY retraining state 616 to the main band training state 608 of FIG. 6. The signaling begins after sideband initialization has been performed. The module and the module partner have already initialized main band data communication 1012. In this example, the module 1002 and module partner 1004 have already performed a parameter handshake to determine whether a variable link width is supported.

The module 1002 has determined that a data line is faulty in the main band 1028. In response to this determination or a command, the module 1002 determines to change the link width to exclude the faulty data line. The module 1002 then starts a link width configuration process 1006. The module 1002 sends a transmit link width request 1030 to the module partner 1004 through the sideband. The transmit link width request is an enable request to the module partner to operate the main band at a specified transmit link width that excludes any faulty transmit data line. The request for a transmit link width is then answered with a transmit link width response 1032 through the sideband. The module then sends a receive link width request 1034 through the sideband. The receive link width request 1034 is an enable request to the module partner to operate the main band at a specified receive link width that excludes any faulty receive transmit line. If there is a faulty transmit data line that is different from a faulty receive data line, then the different lines may be excluded by specifying a different set of transmit data lines from the specified set of receive data lines. The receive link width request 1034 is answered by a receive link width response 1036 through the sideband.

After the link width configuration process, A main band clock training 1014 may be started. This process may include an initialization request and response followed by a clock repair training pattern that is bi-directional through the main band connection and follows a known pattern so that the transmitter and receiver at each end are able to detect and train to the clock signal. Any other suitable clock training process may be used. The main band clock training 1014 may be followed by main band data line training 1016. The main band data line training may also be bi-directional through all the enabled data lines of the main band. The signals then proceed to link initialization 1018 and then to main band data communication 1020 using the new link widths.

Figure 11:
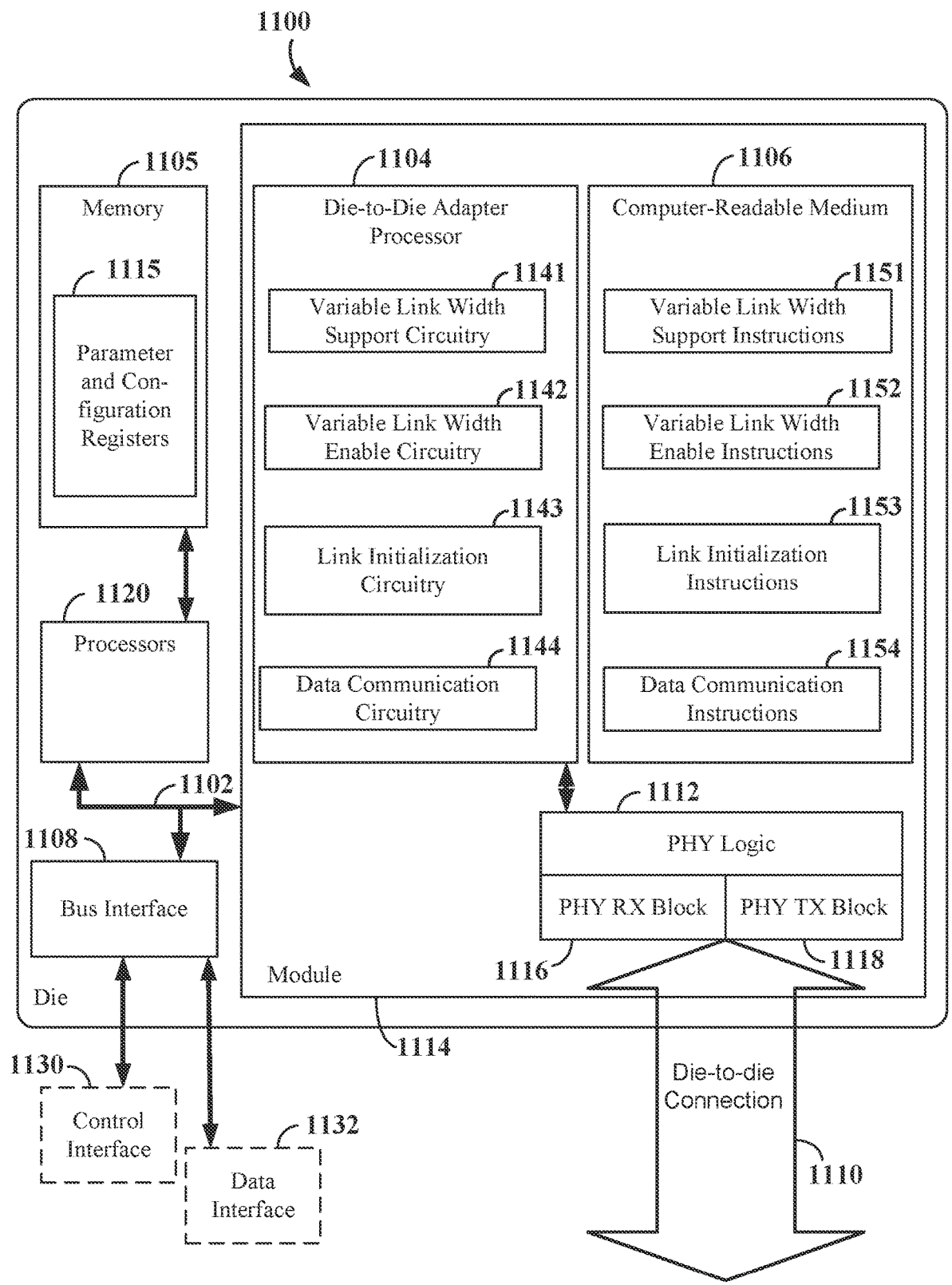
FIG. 11 is a block diagram of a die with a module according to aspects of the present disclosure.

FIG. 11 is a block diagram of an example of a hardware implementation for a die 1100 e.g., a central processor, a graphics processor, a special purpose processor, a volatile memory, a non-volatile memory, an input/output controller, or any other suitable components with a die-to-die connection 1110 having a sideband and a main band. In this example, the die has processors 1120 for performing the primary operations of the die and a memory 1105. The die has a module 1114 to support a die-to-die connection 1110 with a die-to-die adapter processor 1104, a computer-readable medium 1106, PHY logic 1112, a PHY receive block 1116 and a PHY transmit block 1118. The die-to-die adapter processor 1104 performs the operations described above to service the die-to-die connection 1110 between the die 1100 and one or more other dies (not shown).

In accordance with various aspects of the disclosure, an element, or any portion of an element, or any combination of elements may be implemented with the module 1114. Examples of the module 1114 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection 1110 and the clocking modes as described throughout this disclosure. In various examples, the die 1100 may be configured to perform any one or more of the functions described herein. The die contains other components (not shown) configured to perform other functions of the die as is suitable for the type of die.

In this example, the module has a module with a processor 1120 for performing the primary operations of the module, a memory 1105, and a computer-readable medium 1106. A die-to-die adapter processor 1104 performs the operations described above to service the interconnection 1102 between the module 1114 and a module partner 1004 or another module. In accordance with various aspects of the disclosure, an element, or any portion of an element, or any combination of elements may be implemented with the module 1114. Examples of the processor include a central processor, a graphics processor, a special purpose processor, a memory controller, and an input/output controller. Examples of the die-to-die adapter processor 1104 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection and the clocking modes as described throughout this disclosure. In various examples, the module 1114 may be configured to perform any one or more of the functions described herein. The module contains other components (not shown) configured to perform other functions of the module as is suitable for the type of die.

In this example, the die 1100 may be implemented with a bus architecture, represented generally by the bus 1102. The bus 1102 may include any number of interconnecting buses and bridges depending on the specific application of the module 1114, the die 1100 and the overall design constraints. The bus 1102 communicatively couples together various circuits including processors 1120, the die-to-die adapter processor 1104, the memory 1105, and the computer-readable media (represented generally by the computer-readable medium 1106) having instructions stored thereon. The bus 1102 may also link various other circuits such as timing sources, peripherals, data buffers, modules, power management circuits, and other processing cores, which are not described any further. A bus interface 1108 provides an interface between the bus 1102 and other optional external interfaces e.g., a control interface 1130 and a data interface 1132, etc. The processors 1120 are a higher layer with respect to the die-to-die adapter processor 1104 and coupled to the die-to-die adapter processor through the bus 1102. The processors 1120 may communicate operations, administration, or management control with the die-to-die adapter processor 1104 or the die-to-die adapter processor 1104 may operate autonomously. In some examples, the die-to-die adapter receives a request to reduce a data rate of the main band from a higher layer, e.g., the processors 1120/

The control interface 1130 may be used to provide a communication interface or means of communicating with various other apparatuses and devices (for example, other devices housed within the same package or system) over an internal bus or external transmission medium, such as command and control interface for power regulation, power-on test, and other purposes. The data interface 1132 may be used to provide data connections other than the die-to-die connection 1110 to other types of components within the package or system. The control interface 1130 and the data interface 1132 may be connected to a higher layer to receive reset and configuration commands that may cause the die-to-die processor to switch to a single clock mode.

The module 1114 includes a PHY receive block 1116 that corresponds to the sideband and main band receivers described above and a PHY transmit block 1118 that corresponds to the sideband and main band transmitters described above. The PHY transmit block 1116 and the PHY receive block 1118 are coupled to the die-to-die connection 1110 that corresponds to the physical part of the sideband 136 and main band 130 lanes described above that couple the first die 101 and the second die 102 through pins on respective die connectors. The module also includes PHY logic 1112 which may include the link logic to control the data applied to each line and the state machines described above under the control of the die-to-die adapter processor. The PHY logic 1112 may also include clock generators coupled to clock sources to generate the sideband and main band clock signals as described above.

The die-to-die adapter processor 1104 is responsible for managing the PHY logic 1112 and for interface processing, including the execution of software stored on the computer-readable medium 1106. The software, when executed by the die-to-die adapter processor 1104, causes the module 1114 to perform the various functions described below for any particular apparatus. The computer-readable medium 1106 and the memory 1105 may also be used for storing data that is manipulated by the die-to-die adapter processor 1104 when executing software.

The die-to-die adapter processor 1104 may be a part of the processors 1120 or of one or more other processor cores of the die 1100 (not shown) and perform operations by means of a processor core executing software stored in the computer-readable medium 1106, or the die-to-die adapter processor 1104 may be independent of any other processing resources of the die 1100 to execute software stored on the computer-readable medium 1106 using its own processing resources. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The die-to-die adapter processor 1104 controls the operations performed by state machines, e.g., those of FIGS. 5 and 6 and causes the signaling of the signaling diagrams 800, 900, 1000 and causes the clock repair training patterns to be transmitted and received.

The computer-readable medium 1106 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 1106 may reside in the module 1114 or another part of the die 1100. The computer-readable medium 1106 may be embodied in a firmware for the operation of a state machine or parameters of an ASIC. Those skilled in the art will recognize how best to implement the described functionality presented throughout this disclosure depending on the particular application and the overall design constraints imposed on the overall system.

The die 1100 may be configured to perform any one or more of the operations described herein. In some aspects of the disclosure, the die-to-die adapter processor 1104, as utilized in the die 1100, may include circuitry configured for various functions.

The die-to-die adapter processor 1104 is coupled to the memory 1105 through the bus 1122. The memory 1105 includes parameter and configuration registers 1115 that may include parameters for different link widths for the data lanes as shown in Table 1 and in Table 2. Any other parameters and configuration values may also be stored including those for the operation of the main band in PCIe or CXL operation.

The die-to-die adapter processor 1104 may include variable link width support circuitry 1141 to send requests and receive responses with a module partner to support variable link width for a data communications main band and to set a support parameter in a link configuration register of the parameter and configuration registers 1115. The variable link width support circuitry 1141 may include one or more hardware components that provide the physical structure that performs various processes related to sending requests and receiving responses with a module partner to support variable link width support and to set a support parameter. The variable link width support circuitry 1141 may include functionality for a means for sending a support request to a module partner and a means for receiving a support response from the module partner through a sideband to support a variable link width for a main band and means for setting a support parameter in a link configuration register of the parameter and configuration registers 1115. The variable link width support circuitry 1141 may further be configured to execute variable link width support instructions 1151 included on the computer-readable medium 1106 to implement the variable link width support described herein.

The die-to-die adapter processor 1104 may include variable link width enable circuitry 1142 configured to send and receive enable requests to the module partner and receive enable responses from the module partner through the sideband. The enable request is to operate the main band at a specified link width, where the specified link width has a specified set of data lines of the main band, as discussed herein. The variable link width enable circuitry 1142 may include functionality for a means responsive to a command or table inference from e.g., Table 2 to enable a specified link width and to send and receive requests and responses to enable a specified link width. The variable link width enable circuitry may further set parameters for operating at a specified link width in a link configuration register. The variable link width enable circuitry 1142 may further be configured to execute variable link width enable instructions 1152 included on the computer-readable medium 1106 to implement one or more functions described herein.

The module 1114 die-to-die adapter processor 1104 may include link initialization circuitry 1143 configured to perform operations initializing a main band at a specified transmit link width and a specified receive link width as discussed herein. The link initialization circuitry 1143 may include functionality for initializing the link and may also include functionality for main band clock training and main band data line training. The link initialization circuitry 1143 may include functionality for a means for initializing a main band link at a specified link width. The link initialization circuitry 1143 may further be configured to execute link initialization instructions 1153 included on the computer-readable medium 1106 to implement one or more functions described herein.

The die-to-die adapter processor 1104 may include data communication circuitry 1144 configured to communicate data with another module through a main band connection of the die-to-die connection 1110 using the initialized main band with the specified link width, as discussed herein. The data communication circuitry 1144 may include functionality for a means for communicating data with another module through a main band connection using the specified link width. The data communication circuitry 1144 may further set parameters for operating different link widths in a link configuration register. The data communication circuitry 1144 may further be configured to execute data communication instructions 1154 included on the computer-readable medium 1106 to implement one or more functions described herein.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 12:
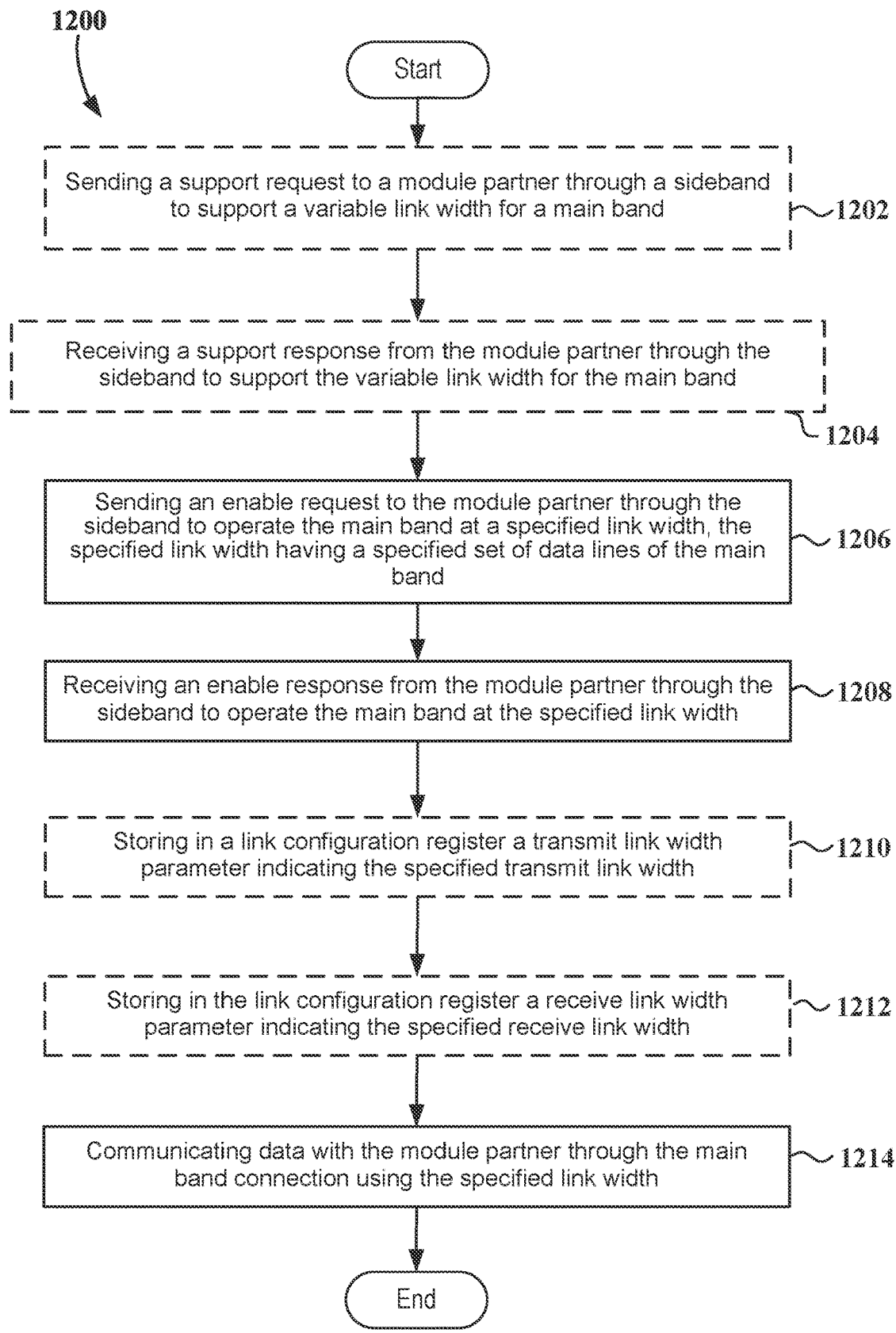
FIG. 12 is a flow diagram of aspects of operating a die-to-die connection with a variable link width according to aspects of the present disclosure.

FIG. 12 is a process flow diagram illustrating an example of a method for using a link width with a die-to-die connection such as the connections of FIGS. 1-5. The method may be performed in the die-to-die adapter processor 1104 of FIG. 11 or other circuitry, and software as described in the context of FIG. 11. The method 1200 optionally begins at block 1202 with sending a support request to a module partner through a sideband to support a variable link width for a main band. Sending the support request may be performed during a main band initialization. Alternatively, the dies may be configured to support a variable link width without any handshake of support parameters.

Responsive to the request message, the module partner may send a response. The method 1200 continues in block 1204 with optionally receiving a support response from the module partner through the sideband to support the variable link width for the main band.

In block 1206, sending an enable request to the module partner through the sideband to operate the main band at a specified link width, the specified link width having a specified set of data lines of the main band is performed. The module partner may then perform receiving an enable response from the module partner through the sideband to operate the main band at the specified link width at block 1208. The enable request may include a single specified transmit link width for both the transmit and receive lines. In some aspects the enable request may have a specified set of transmit data lines and a specified receive link width having a specified set of receive data lines. In some aspects, a request is received from an upstream component to reduce a data rate of the main band. Sending the enable request is performed in response to the request to reduce the data rate.

In block 1210, optionally, storing in a link configuration register a transmit link width parameter indicating the specified transmit link width is performed. In block 1212, optionally, storing in the link configuration register a receive link width parameter indicating the specified receive link width is performed. In some aspects only a single link width is stored for both transmit and receive.

After variable link width is supported, variable link width is enabled and a link width is specified, the main band is operated with the specified link width. In block 1216, communicating data with the module partner through the main band using the specified link width is performed.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: A method comprising: sending an enable request from a module of a first die to a module partner of a second die through a sideband to operate a main band of a die-to-die connection that connects the first die module to the second die module partner at a specified link width, the specified link width having a specified set of data lines of the main band; receiving an enable response from the module partner through the sideband to operate the main band at the specified link width; and communicating data with the module partner through the main band using the specified link width in response to receiving the enable response.

Example 2: The method of example 1, wherein the sending the enable request comprises sending an enable request that includes a specified transmit link width having a specified set of transmit data lines and a specified receive link width having a specified set of receive data lines.

Example 3: The method of example 2, further comprising storing in a link configuration register a transmit link width parameter indicating the specified transmit link width and storing in the link configuration register a receive link width parameter indicating the specified receive link width.

Example 4: The method of example 2 or 3, wherein the specified transmit link width is different from the specified receive link width.

Example 5: The method of any one or more of the above examples, further comprising training the main band by training the specified set of data lines among the specified link width.

Example 6: The method of any one or more of the above examples, further comprising disabling data lines of the main band that are not among the specified set of data lines.

Example 7: The method of example 6, further comprising tri-stating receive lines of the main band that are not among the specified set of data lines.

Example 8: The method of any one or more of the above examples, further comprising receiving a request from an upstream component to reduce a data rate of the main band and wherein the sending the enable request is performed in response to the request to reduce the data rate.

Example 9: The method of any one or more of the above examples, further comprising: sending a request to the module partner through the sideband to support the variable link width for the main band before sending the enable request; and receiving a support response from the module partner to support the variable link width for the main band.

Example 10: The method of example 9, wherein the sending the support request comprises sending the support request during a main band initialization.

Example 11: The method of any one or more of the above examples, wherein the sending the enable request comprises sending an enable parameter and a link width parameter, the method further comprising storing the enable parameter and the link width parameter in a link configuration register.

Example 12: The method of any one or more of the above examples, further comprising before the sending the enable request, initializing the main band with the module partner using a second link width; communicating data with the module partner through the main band using the second link width; and detecting a faulty data line during the communicating the data in the second link width.

Example 13: The method of example 12, wherein the communicating the data using the specified link width comprises communicating the data at half the data rate of the communicating the data using the second link width.

Example 14: The method of example 13, wherein the specified link width excludes the faulty data line.

Example 15: The method of any one or more of the above examples, further comprising: detecting a faulty transmit data line of the main band; sending a second enable request to the module partner to operate the main band at a second specified transmit link width, the second specified transmit link width excluding the faulty data line; and communicating data with the module partner through the main band at the second specified transmit link width and the specified receive link width.

Example 16: A non-transitory computer-readable medium having instructions stored therein for causing a processor of a die to perform operations comprising: sending an enable request from a module of a first die to a module partner of a second die through a sideband to operate a main band of a die-to-die connection that connects the first die module to the second die module partner at a specified link width, the specified link width having a specified set of data lines of the main band; receiving an enable response from the module partner through the sideband to operate the main band at the specified link width; and communicating data with the module partner through the main band using the specified link width in response to receiving the enable response.

Example 17: The medium of example 16, wherein the sending the enable request comprises sending an enable request that includes a specified transmit link width having a specified set of transmit data lines and a specified receive link width having a specified set of receive data lines.

Example 18: The medium of example 16 or 17, the operations further comprising receiving a request from an upstream component to reduce a data rate of the main band and wherein the sending the enable request is performed in response to the request to reduce the data rate.

Example 19: The medium of any one or more of examples 16-18, wherein the sending the enable request is performed in response to detecting a faulty data line during data communication through the main band.

Example 20: An apparatus comprising: a sideband transmitter of a module of a first die configured to send an enable request to a module partner of a second die through a sideband of a die-to-die connection to operate a main band of the die-to-die connection at a specified link width, the specified link width having a specified set of data lines of the main band; a sideband receiver of the module configured to receive an enable response from the module partner through the sideband to operate the main band at the specified link width; and a main band transmitter configured to send data to the module partner through the main band using the specified link width in response to receiving the enable response.

Example 21: The apparatus of example 20, wherein the sideband transmitter is further configured to send a support request to the module partner to support a variable link width for a main band, and wherein the sideband receiver is further configured to receive a support response from the module partner to support the variable link width for the main band before the sending the enable request from the sideband transmitter.

Example 22: The apparatus of example 20 or 21, further comprising a link configuration register and a die-to-die adapter processor, wherein the die-to-die adapter process is configured to store a transmit link width parameter indicating a specified transmit link width and to store a receive link width parameter indicating the specified receive link width in the link configuration register.

It is to be appreciated that the present disclosure is not limited to the exemplary terms used above to describe aspects of the present disclosure. E.g., the die-to-die connection may also be referred to as an interconnect, a bus, a link, or another term.

Although aspects of the present disclosure are discussed above using the example of UCIe 1.0, it is to be appreciated that the present disclosure is not limited to this example, and may be used with other standards.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method comprising:
   sending an enable request from a module of a first die to a module partner of a second die through a sideband to operate a main band of a die-to-die connection that connects the first die module to the second die module partner at a specified transmit link width, wherein the specified transmit link width has a specified set of transmit data lines of the main band;
   receiving an enable response from the module partner through the sideband to operate the main band at the specified transmit link width;
   sending a second enable request including from the module of the first die to the module partner of the second die through the sideband to operate the main band of the die-to-die connection that connects the first die module to the second die module partner at a specified receive link width, wherein the specified receive link width has a specified set of receive data lines of the main band;
   receiving a second enable response from the module partner through the sideband to operate the main band at the specified receive link width; and
   communicating data with the module partner through the main band using a specified link width in response to receiving the enable response, wherein the specified link width includes the specified transmit link width and the specified receive link width.

2. The method of claim 1, further comprising storing in a link configuration register a transmit link width parameter indicating the specified transmit link width and storing in the link configuration register a receive link width parameter indicating the specified receive link width.

3. The method of claim 1, wherein the specified transmit link width is different from the specified receive link width.

4. The method of claim 1, further comprising training the main band by training only the specified set of transmit data lines among the specified transmit link width and the specified set of receive data lines among the specified receive link width.

5. The method of claim 1, further comprising disabling data lines of the main band that are not among the specified set of receive data lines and the specified set of transmit data lines.

6. The method of claim 5, further comprising tri-stating receive lines of the main band that are not among the specified set of receive data lines.

7. The method of claim 1, further comprising receiving a request from an upstream component to reduce a data rate of the main band and wherein the sending the enable request is performed in response to the request to reduce the data rate.

8. The method of claim 1, further comprising:
   sending a support request to the module partner through the sideband to support the specified link width for the main band before sending the enable request; and
   receiving a support response from the module partner to support the specified link width for the main band.

9. The method of claim 8, wherein the sending the support request comprises sending the support request during a main band initialization.

10. The method of claim 1, wherein the sending the enable request comprises sending a transmit enable parameter and a transmit link width parameter, the method further comprising storing the transmit enable parameter and the transmit link width parameter in a link configuration register.

11. The method of claim 1, further comprising before the sending the enable request:
    initializing the main band with the module partner using a second link width;
    communicating data with the module partner through the main band using the second link width; and
    detecting a faulty data line during the communicating the data in the second link width.

12. The method of claim 11, wherein the communicating the data using the specified link width comprises communicating the data at half the data rate of the communicating the data using the second link width.

13. The method of claim 12, wherein the specified link width excludes the faulty data line.

14. The method of claim 1, further comprising:
    detecting a faulty transmit data line of the main band;
    sending a third enable request to the module partner to operate the main band at a second specified transmit link width, the second specified transmit link width excluding the faulty data line; and communicating data with the module partner through the main band at the second specified transmit link width and the specified receive link width.

15. A non-transitory computer-readable medium having instructions stored therein for causing a processor of a die to perform operations comprising:

sending an enable request from a module of a first die to a module partner of a second die through a sideband to operate a main band of a die-to-die connection that connects the first die module to the second die module partner at a specified transmit link width, wherein the specified transmit link width has a specified set of transmit data lines of the main band;

receiving an enable response from the module partner through the sideband to operate the main band at the specified transmit link width;

sending a second enable request from the module of the first die to the module partner of the second die through the sideband to operate the main band of the die-to-die connection that connects the first die module to the second die module partner at a specified receive link width, wherein the specified receive link width has a specified set of receive data lines of the main band;

receiving a second enable response from the module partner through the sideband to operate the main band at the specified receive link width; and communicating data with the module partner through the main band using a specified link width in response to receiving the enable response, wherein the specified link width includes the specified transmit link width and the specified receive link width.

16. The medium of claim 15, the operations further comprising receiving a request from an upstream component to reduce a data rate of the main band and wherein the sending the enable request is performed in response to the request to reduce the data rate.

17. The medium of claim 15, wherein the sending the enable request is performed in response to detecting a faulty data line during data communication through the main band.

18. An apparatus comprising:

a sideband transmitter of a module of a first die configured to send an enable request to a module partner of a second die through a sideband of a die-to-die connection to operate a main band of the die-to-die connection at a specified transmit link width, wherein the specified transmit link width has a specified set of transmit data lines of the main band, a sideband receiver of the module configured to receive an enable response from the module partner through the sideband to operate the main band at the specified transmit link width;

wherein the sideband transmitter is configured to send a second enable request from the module of the first die to the module partner of the second die through the sideband to operate the main band of the die-to-die connection that connects the first die module to the second die module partner at a specified receive link width, wherein the specified receive link width has a specified set of receive data lines of the main band;

wherein the sideband receiver is configured to receive a second enable response from the module partner through the sideband to operate the main band at the specified receive link width; and a main band transmitter configured to send data to the module partner through the main band using a specified link width in response to receiving the enable response, wherein the specified link width includes the specified transmit link width and the specified receive link width.

19. The apparatus of claim 18, wherein the sideband transmitter is further configured to send a support request to the module partner to support a variable link width for a main band, and wherein the sideband receiver is further configured to receive a support response from the module partner to support the variable link width for the main band before the sending the enable request from the sideband transmitter.

20. The apparatus of claim 18, further comprising a link configuration register and a die-to-die adapter processor, wherein the die-to-die adapter processor is configured to store a transmit link width parameter indicating a specified transmit link width and to store a receive link width parameter indicating the specified receive link width in the link configuration register.

* * * * *